(12) United States Patent
Kang et al.

(10) Patent No.: US 10,704,732 B2
(45) Date of Patent: Jul. 7, 2020

(54) HORIZONTAL POSTURE MAINTAINING DEVICE AND POSTURE MAINTAINING DEVICE DRIVING METHOD

(71) Applicant: SAMSUNG ELECTRONICS CO., LTD., Suwon-si, Gyeonggi-do (KR)

(72) Inventors: Yoon-Seok Kang, Seoul (KR); Bon-Min Koo, Seoul (KR); Min-Hyuk Nam, Seoul (KR); Sung-Jin Park, Suwon-si (KR); Jae-Kyu Shim, Suwon-si (KR); Hyun-Min Oh, Yongin-si (KR); Bae-Seok Lim, Suwon-si (KR); Woo-Jong Cho, Suwon-si (KR); Hee-Seung Choi, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 28 days.

(21) Appl. No.: 16/307,012

(22) PCT Filed: Mar. 29, 2017

(86) PCT No.: PCT/KR2017/003419
§ 371 (c)(1),
(2) Date: Dec. 4, 2018

(87) PCT Pub. No.: WO2017/213339
PCT Pub. Date: Dec. 14, 2017

(65) Prior Publication Data
US 2019/0219224 A1    Jul. 18, 2019

(30) Foreign Application Priority Data
Jun. 8, 2016  (KR) .......................... 10-2016-0070913

(51) Int. Cl.
*F16M 13/04* (2006.01)
*H04N 5/232* (2006.01)
(Continued)

(52) U.S. Cl.
CPC .......... *F16M 13/04* (2013.01); *F16M 11/041* (2013.01); *F16M 11/18* (2013.01);
(Continued)

(58) Field of Classification Search
None
See application file for complete search history.

(56) References Cited

U.S. PATENT DOCUMENTS

2006/0053912 A1   3/2006  Miller
2010/0171377 A1   7/2010  Aicher et al.
(Continued)

FOREIGN PATENT DOCUMENTS

KR    10-2015-0141352    12/2015

OTHER PUBLICATIONS

International Search Report for PCT/KR2017/003419, dated Jul. 6, 2017, 4 pages.
(Continued)

*Primary Examiner* — Noam Reisner
*Assistant Examiner* — Dennis Hancock
(74) *Attorney, Agent, or Firm* — Nixon & Vanderhye, P.C.

(57) ABSTRACT

A posture maintaining device for a 360° camera according to an embodiment of the present invention may comprise: a first correcting portion comprising a seating portion, on which a camera having a 360° view angle is seated, the first correcting portion being able to make a rotational movement about a first direction; a second correcting portion arranged on one side of the first correcting portion to be able to make a rotational movement about a second direction, which is
(Continued)

different from the first direction; a third correcting portion arranged on the lower end of the second correcting portion to be able to make a rotational movement about a third direction, which is different from the first or second direction; and a counterbalance connected to the first correcting portion and configured to guide the camera so as to remain horizontal. A posture maintaining device for a 360° camera according to an embodiment of the present invention corrects the inclination in real time when images are taken through a camera having a 360° view angle, making it possible to implement pictures or moving images without vibration. Moreover, when images are taken through a camera having a 360° view angle, a gimbal with minimized image blocking is implemented, making it possible to obtain images with minimized interference.

10 Claims, 14 Drawing Sheets

(51) Int. Cl.

| | | |
|---|---|---|
| *G03B 17/56* | (2006.01) | |
| *F16M 13/00* | (2006.01) | |
| *F16M 11/20* | (2006.01) | |
| *F16M 11/18* | (2006.01) | |
| *F16M 11/04* | (2006.01) | |
| *H04N 5/225* | (2006.01) | |

(52) U.S. Cl.
CPC ....... *F16M 11/205* (2013.01); *F16M 11/2021* (2013.01); *F16M 11/2071* (2013.01); *F16M 13/00* (2013.01); *G03B 17/56* (2013.01); *G03B 17/561* (2013.01); *G03B 17/563* (2013.01); *H04N 5/2252* (2013.01); *H04N 5/232* (2013.01); *H04N 5/23238* (2013.01); *F16M 2200/041* (2013.01); *F16M 2200/044* (2013.01); *H04N 5/2328* (2013.01)

(56) References Cited

U.S. PATENT DOCUMENTS

| | | |
|---|---|---|
| 2014/0205276 A1 | 7/2014 | Johnston et al. |
| 2014/0270743 A1 | 9/2014 | Webb et al. |
| 2015/0071627 A1 | 3/2015 | Hoang |
| 2015/0308618 A1 | 10/2015 | Valero |
| 2015/0312468 A1 | 10/2015 | Taylor et al. |
| 2016/0083110 A1* | 3/2016 | Pan .................. G03B 17/561 348/144 |

OTHER PUBLICATIONS

Written Opinion of the ISA for PCT/KR2017/003419, dated Jul. 6, 2017, 6 pages.

* cited by examiner

HORIZONTAL POSTURE MAINTAINING DEVICE AND POSTURE MAINTAINING DEVICE DRIVING METHOD

This application is a National Phase Entry of PCT International Application No. PCT/KR2017/003419, which was filed on Mar. 29, 2017 and claims priority under 35 U.S.C. § 119 of Korean Patent Application No. 10-2016-0070913, filed on Jun. 8, 2016, in the Korean Intellectual Property Office, the disclosure of which is incorporated herein by reference in its entirety.

TECHNICAL FIELD

The present disclosure relates to a horizontal posture maintaining device for an omnidirectional camera and a driving method of the horizontal posture maintaining device and, more particularly, to a posture maintaining device for an omnidirectional camera, which guides maintenance of horizontality in real time while a user captures an image, and a driving method thereof.

BACKGROUND ART

Generally, when taking a photograph or a moving image, it is required for a user to capture an image in a state where the camera is kept horizontal without shaking. For example, it has become common for users to easily perform photographing while using a compact video recorder, a camcorder, a mobile phone, or the like outdoors, and thus requests for improvement of portable devices that stabilize shaking of a video, a camcorder, a mobile phone, etc., and demands for such portable devices have been steadily increasing. For example, for cameras for movies and videos, which are image products, efforts are being made to obtain photographing results in which a focus is not shaken during each photographing while moving in order to obtain flexible and high-quality results. Therefore, steady cams or gimbals, which are widely used in the TV and movie industry in order to obtain stable results, have been developed to prevent shaking relatively well during photographing while moving.

DETAILED DESCRIPTION OF THE INVENTION

Technical Problem

Since a steady cam has been manufactured so as to be mainly used for a video camera or a camera, there is a problem in that it is difficult to use a relatively thin mobile phone or a storage device in the state of being mounted on or coupled to such a steady cam. In addition, as a method of fixing a camera, which is capable of continuous photographing, such as a mobile phone or an oriented device, to a portable device, the portable device is configured such that the camera is positioned at the center of a stage and then front, rear, right and left positions and is then adjusted using an adjustment bolt so as to bring the camera into focus, thus there is a problem in that operation and maintenance are difficult.

In addition, a horizontal posture maintaining device such as a conventional gimbal is made only for a camera capable of photographing in one direction, and thus a driving unit and a frame are disposed on the rear side of the camera. Therefore, in the case of an omnidirectional camera, which is capable of photographing 360 degrees, there is a problem in that since it is necessary to capture images in all directions, a part of a gimbal structure interferes with the screen, which makes it impossible to obtain desired images.

A horizontal posture maintaining device for a camera according to an embodiment of the present disclosure is to implement an image, which minimizes interference with a view angle during photographing by a camera capable of 360-degree photographing.

A horizontal posture maintaining device for a camera according to an embodiment of the present disclosure is to take an image or photograph without blur using a device with simple structure to which a camera capable of 360-degree photographing is coupled and which can be easily carried by a user.

Technical Solution

According to an embodiment of the present disclosure, a horizontal posture maintaining device may include: a first correction unit including a seat portion, on which a camera module is seated, and configured to be rotatable about a first direction; a second correction unit disposed on one side of the first correction unit, and configured to be rotatable about a second direction different from the first direction; a third correction unit disposed at a lower end of the second correction unit, and configured to be rotatable about a third direction different from the first direction or the second direction; and a counterbalance connected to the first correction unit, and configured to guide maintenance of horizontality of the camera; and a counterbalance connected to the first correction unit, and configured to guide maintenance of horizontality of the camera.

According to an embodiment of the present disclosure, a driving method of a horizontal posture maintaining device may perform: an operation of determining whether or not at least one of a camera module and a correction unit is horizontal or is moved using a sensor unit disposed in the at least one of the camera module and the sensor unit disposed in the correction unit; an operation in which a control unit transmits a control signal, which is required for the at least one correction unit, to the at least one correction unit in real time by a control unit in order to maintain an image captured by the camera horizontally; and an operation in which the at least one correction unit controls rotation depending on power supply controlled by the control unit so as to rotate the camera module or the at least one correction unit about at least one of first, second, and third directions (X axis, Y axis, and Z axis), thereby performing correction for maintaining a horizontal posture of the camera module.

Advantageous Effects

The posture maintaining device for a camera according to an embodiment of the present disclosure corrects the inclination in real time when capturing an image through the camera having a 360-degree view angle, so that a photograph or a moving image can be implemented without blur.

The horizontal posture maintaining device for a camera according to an embodiment of the present disclosure implements a gimbal that minimizes image blocking during the photographing of an image with a camera having a 360-degree view angle, so that an image with minimized interference can be obtained.

The horizontal posture maintaining device for a camera according to an embodiment of the present disclosure is capable of adjusting the center of gravity to move to the center of a driving unit using a movable balance weight. Therefore, the load applied to the driving unit is minimized, so that the life of the horizontal posture maintaining device can be prolonged and a smooth movement can be implemented.

MODE FOR CARRYING OUT THE INVENTION

Figure 1:
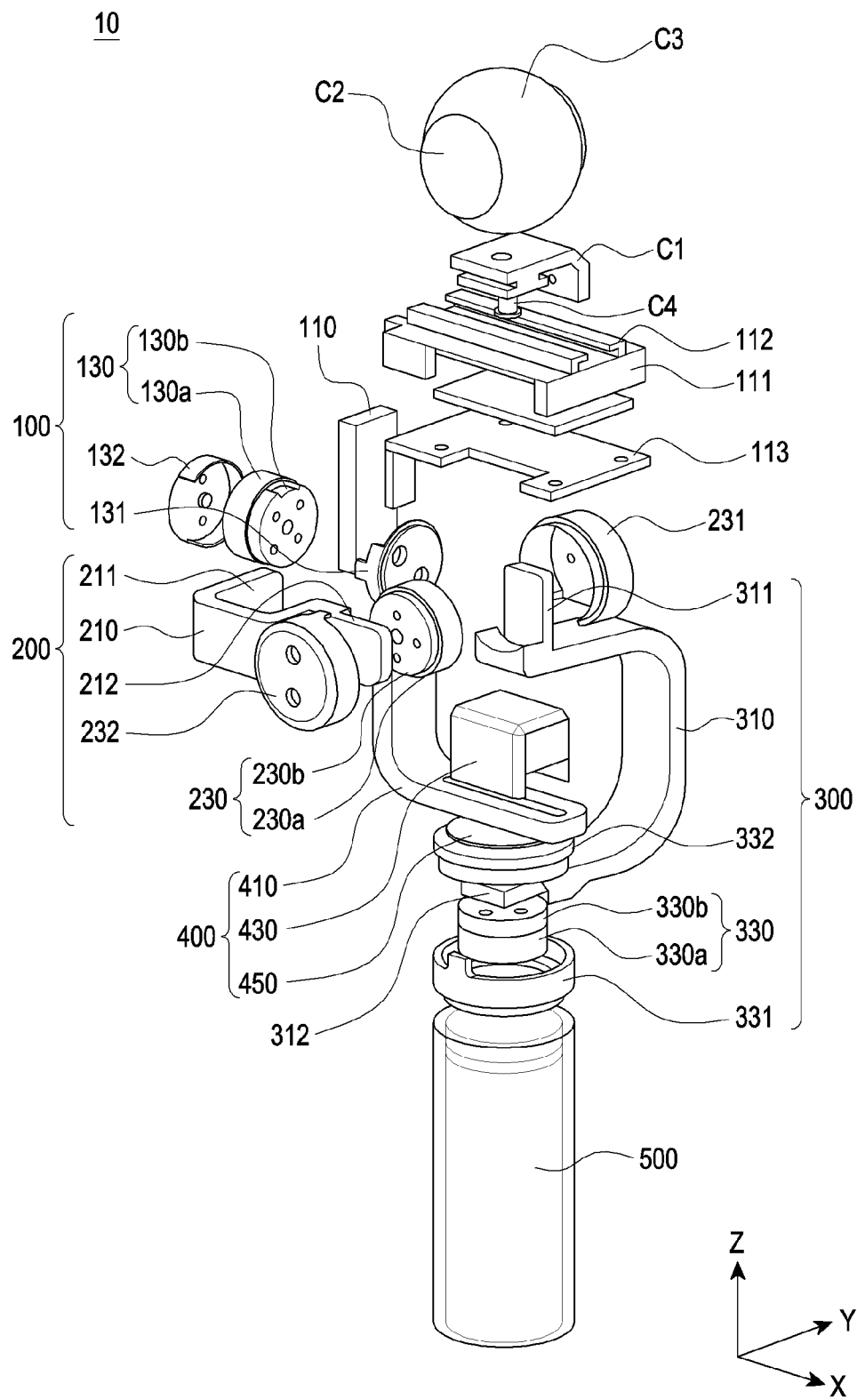
FIG. 1 is an exploded perspective view illustrating a configuration of a posture maintaining device for an omnidirectional camera according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the various embodiments of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, terms defined in this specification may not be interpreted as excluding embodiments of the present disclosure.

Hereinafter, a posture maintaining device for a 360-degree camera according to various embodiments will be described with reference to the accompanying drawings. In this document, the term "user" may refer to a person using a posture maintaining device for a 360-degree camera or a device using the posture maintaining device for a 360-degree camera (e.g., an artificial intelligence electronic device).

Figure 2:
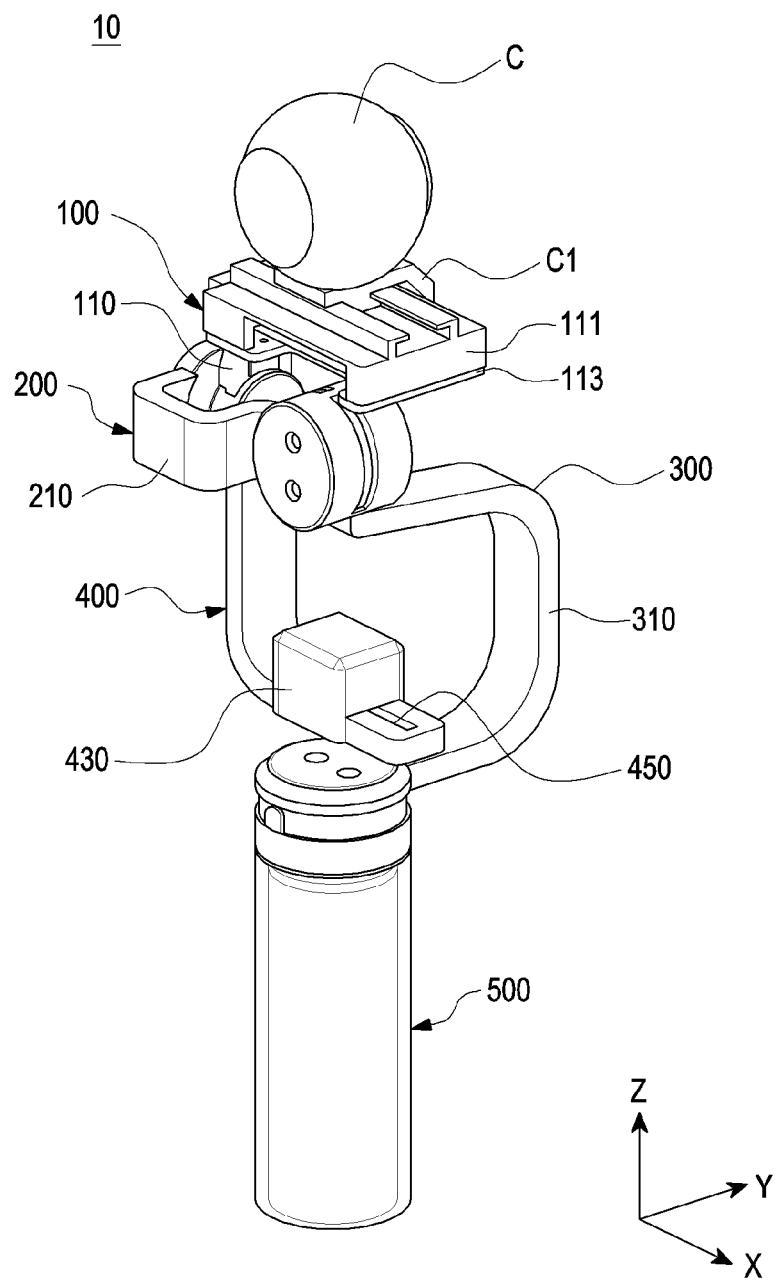
FIG. 2 is a perspective view illustrating the posture maintaining device for an omnidirectional camera according to the embodiment of the present disclosure.
Figure 3:
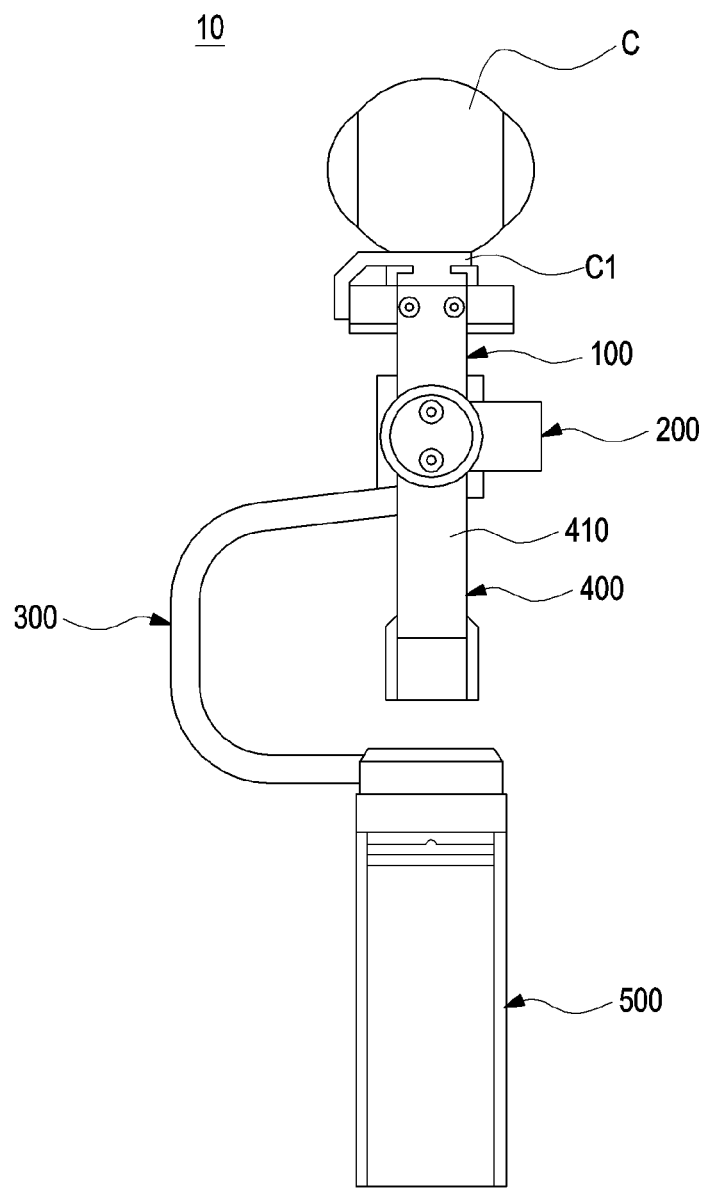
FIG. 3 is a side view illustrating the posture maintaining device for an omnidirectional camera according to the embodiment of the present disclosure.

FIG. 1 is an exploded perspective view illustrating a configuration of a posture maintaining device 10 for a 360-degree camera according to an embodiment of the present disclosure. FIG. 2 is a perspective view illustrating the posture maintaining device 10 for a 360-degree camera according to the embodiment of the present disclosure. FIG. 3 is a side view illustrating the posture maintaining device 10 for a 360-degree camera according to the embodiment of the present disclosure.

In FIGS. 1 to 3, in a three-dimensional orthogonal coordinate system, the "X" axis may mean a width direction in which a camera module C of the posture maintaining device 10 for a 360-degree camera moves, the "Y" axis may mean a distance direction in which a lens unit of the lens module C of the posture maintaining device 10 for a 360-degree camera, and the "Z" axis may mean a longitudinal direction of the posture maintaining device 10 for a 360-degree camera.

In addition, in the embodiment of the present disclosure, the "X-axis direction" may refer to a first direction X, and the "Y-axis direction" may refer to as a second direction Y, and the "Z-axis direction" may refer to a third direction Z.

As illustrated in FIGS. 1 to 3, the posture maintaining device 10 for a 360-degree camera may include a camera module C having an angle of view of 360-degrees, a plurality of correction units 100, 200, and 300 configured to support the camera module C and to maintain and correct a horizontal posture depending on shaking, and a handle unit 500.

According to various embodiments, the correction units 100, 200, and 300 may include a first correction unit 100 capable of rotating about the first direction X, a second correction unit 200 capable about the second direction Y different from the first direction X, and a third correction unit 300 capable of rotating about the third direction Z different from the first direction X or the second direction Y. According to various embodiments, the first correction unit 100 may include a first frame 110 on which the camera module C is mounted and a first driving unit 130 configured to rotate about the first direction X with respect to the first frame 110 in order to maintain the horizontal posture. For example, since the first correction unit 100 assists the maintenance of horizontality of the camera module C in real time while the camera module C is seated thereon and the user captures an image, the remaining region of the posture maintaining device 10 for a 360-degree camera (e.g., the second correction unit 200 or the third correction unit 300) may rotate about the first direction X in the state in which the first correction unit 100 and the camera module C maintains horizontality. A counterbalance 400 for maintaining the center of gravity of the entire posture maintaining device 10 for a 360-degree camera may be disposed under the first correction unit 100.

According to various embodiments, the first driving unit 130 includes a stator 130a and a rotor 130b. The stator 130a may be fixedly disposed on one surface of the stoppers 131 and 132, and the rotator 130b may be disposed to face the stator 130a and connected to a rotary shaft (not illustrated) protruding from the stator 130a so as to be rotatable about the first direction X with respect to the stator 130a.

As another example, the stoppers 131 and 132 may include a stationary stopper 131 provided with a recess in an operable range so as to prevent of the first driving unit 130 from rotating by a predetermined angle or more, and a rotary stopper 132 provided with protrusions inserted in the recess so as to operate in the recess. The stationary stopper 131 may be formed to surround the stator 130a while facing the stator 130a, and the rotary stopper 132 may be formed to surround the rotor 130b while facing the rotor 130b. The stationary stopper 131 and the rotary stopper 132 may serve as a cover to protect the first driving unit 130.

According to various embodiments, the second correction unit 200 may include a second frame 210 disposed below the first frame 110 and a second driving unit 230 configured to rotate about the second direction Y relative to the second frame 210 in order to maintain the horizontal posture of the camera module C. For example, the second correction unit 200 may be connected to one end of the first correction unit 100, and may rotate the constituent elements of the posture maintaining device 10 for a 360-degree camera, other than the second correction unit 200, about the second direction Y in order to maintain the camera module C horizontally.

According to various embodiments, the second driving unit 230 includes a stator 230a and a rotor 230b. The stator 230a is fixedly disposed on one surface of the stoppers 231 and 232, and the rotator 230b may be disposed to face the stator 230a and connected to a rotary shaft (not illustrated) protruding from the stator 230a so as to be rotatable about the first direction X with respect to the stator 230a.

As another example, the stoppers 231 and 232 may include a stationary stopper 231 provided with a recess in an operable range so as to prevent of the second driving unit 230 from rotating by a predetermined angle or more, and a rotary stopper 232 provided with protrusions inserted in the recess so as to operate in the recess. The stationary stopper 231 may be formed to surround the stator 230a while facing the stator 230a, and the rotary stopper 232 may be formed to surround the rotor 230b while facing the rotor 230b. The stationary stopper 231 and the rotary stopper 232 may serve as a cover to protect the first driving unit 230.

According to various embodiments, the third correction unit 300 may include a third frame 310 disposed below the second frame 400 and/or outside the counterbalance 210 and a third driving unit 330 configured to rotate about the third direction Z relative to the third frame 310 in order to maintain the horizontal posture of the camera module C. For example, the third correction unit 300 may be connected to the lower end of the second correction unit 200, and may rotate the constituent elements of the posture maintaining device 10 for a 360-degree camera, other than the third correction unit 300, about the second direction Y in order to maintain the camera module C horizontally.

According to various embodiments, the third driving unit 330 includes a stator 330a and a rotor 330b. The stator 330a is fixedly disposed on one surface of the stoppers 331 and 332, and the rotator 330b may be disposed to face the stator 330a and connected to a rotary shaft (not illustrated) protruding from the stator 330a so as to be rotatable about the third direction Z with respect to the stator 330a.

As another example, the stoppers 331 and 332 may include a stationary stopper 331 provided with a recess in an operable range so as to prevent of the third driving unit 330 from rotating by a predetermined angle or more, and a rotary stopper 332 provided with protrusions inserted in the recess so as to operate in the recess. The stationary stopper 331 may be formed to surround the stator 330a while facing the stator 330a, and the rotary stopper 332 may be formed to surround the rotor 330b while facing the rotor 330b. The stationary stopper 331 and the rotary stopper 332 may serve as a cover to protect the first driving unit 330.

According to various embodiments, the posture maintaining device 10 for a 360-degree camera may further include a counterbalance 400 connected to the first correction unit 100 and configured to guide the maintenance of horizontality of the camera module C. The counterbalance 400 may serve to prevent each of the driving units 130, 230, and 330 from being not driven as the camera module C is tilted or droops. For example, the center of gravity between the camera module C and the first correction unit 100 may be adjusted using a balance weight 430 disposed in the counterbalance 400 so as to be disposed at one end of the first correction unit 100, i.e. at the center of the first driving unit 130. As another example, the center of gravity between the camera module C and the second correction unit 200 may be adjusted using the balance weight 430 disposed in the counterbalance 400 so as to be disposed at the center of the second driving unit of the second correction unit 200.

According to various embodiments, the posture maintaining device 10 for a 360-degree camera may further include a handle unit 500 disposed at the lower end of the third correction unit 300 such that the user is capable of easily gripping the handle unit 500 for photographing. The handle unit 500 may include: a housing 590 disposed to be connected to the lower portion of the third frame 310 and forms an outer experience to be gripped by the user; a power supply 540 disposed inside the housing 590 to be charged from an external power source; at least a portion of a printed circuit unit 510 connected through each of the frames 110, 210, and 310; and a control unit 530 configured to control the rotational movement of the first correction unit 100, the second correction unit 200, or the third correction unit 300 in real time (see FIG. 8).

According to various embodiments, the handle unit 500 may be configured in a cylindrical shape to be easily gripped by the user. However, the shape of the handle unit 500 is not limited thereto, and the shape of the handle unit 500 may be manufactured in various shapes such as a shape in which a finger-shaped groove is provided such that the user conveniently carries the posture maintaining device 10 for a 360-degree camera. As another example, the outer surface of the handle unit 500 may be surrounded by a highly frictional material so as to prevent the user's hand from easily sliding thereon.

Hereinafter, the third correction unit 300, the second correction unit 200, the first correction unit 100, and the camera module C will be described in the order of assembling.

Figure 4:
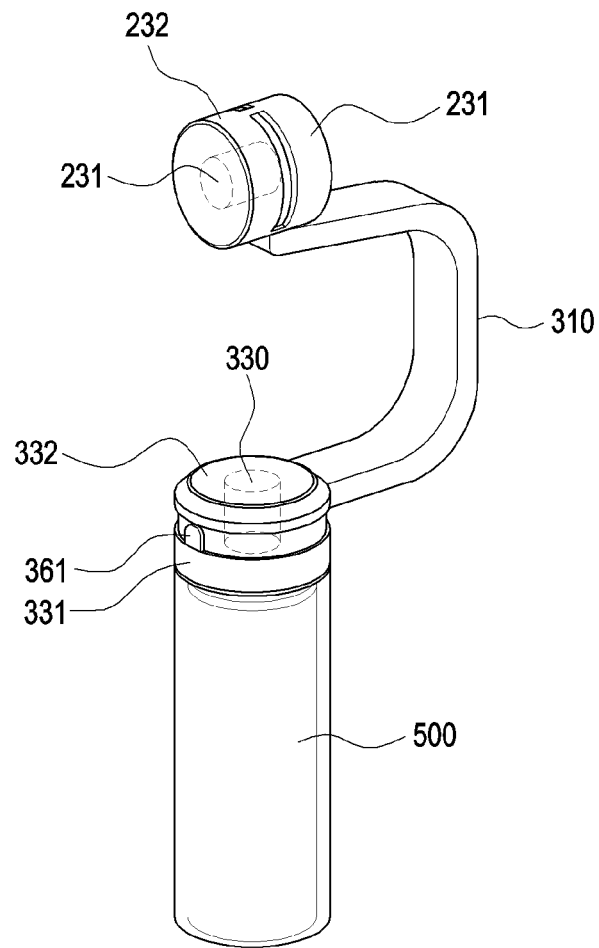
FIG. 4 is a perspective view illustrating a handle unit and a third correction unit of the posture maintaining device for an omnidirectional camera according to an embodiment of the present disclosure.

FIG. 4 is a perspective view illustrating the handle unit 500 and the third correction unit 300 of the posture maintaining device 10 for a 360-degree camera according to an embodiment of the present disclosure.

Referring to FIGS. 1 and 4, the third correction unit 300 may be disposed on the handle 500. The third correction unit 300 may include the third frame 310 configured to rotate about the third direction Z and the third driving unit 330 configured to drive the third frame 310.

According to various embodiments, the third driving unit 330 is disposed on the upper surface of the handle unit 500 and may include a driving motor that is mounted inside the stationary stopper 331 disposed above the handle unit 500 to practically rotate. The stationary stopper 331 may be fixedly fitted into the handle unit 500, and the third driving unit 330 may be fixedly disposed inside stationary stopper 331.

For example, as the control unit 530 (see FIG. 8) supplies power, the rotary shaft of the third driving unit 330 rotates, and according to the rotation of the third driving unit 330, the third frame 310 may rotate about the third direction (Z axis). At this time, the third driving unit 330 is capable of restricting the rotating angle of the third frame 310 while supporting the rotation of the third frame 310 by the stoppers 331 and 332 disposed in the outside.

In addition, the control unit may sense the movements of the handle unit 500 and the third frame 310 through at least one sensor unit (not illustrated), and may control the rotation of the third driving unit 330 by receiving a control signal for maintaining the horizontality of the camera module C in real time according to sensing signals transmitted from the sensor units and controlling the supply of power of the third correction unit 300. According to the supply of the control power of the control unit 530, the third driving unit 330 may rotate the third frame 310 about the third direction (Z axis) and may also rotate the camera module C, thereby correcting the maintenance of the horizontal posture of the camera module C.

According to various embodiments, the third driving unit 330 is connected to the printed circuit unit 510 (see FIG. 9) for supplying power to the driving motor, and the third driving unit 330, which practically moves, may be sensed through a sensor unit (not illustrated) disposed on the third driving unit 330. For example, the sensor unit mounted on the third frame 310 and the third driving unit 330 may measure the physical quantity or may sense the operation state of the posture maintaining device 10 for a 360-degree camera, and may convert the measured or sensed information into an electrical signal. As one example, the sensor unit may include at least one of a gesture sensor, a gyro sensor, an atmospheric pressure sensor, a magnetic sensor, an acceleration sensor, a proximity sensor, an illuminance sensor, or an ultraviolet (UV) sensor. Accordingly, information sensed by the sensor unit is transmitted to the control unit 530 (see FIG. 8) through the printed circuit unit 510, and the rotational movement of the third driving unit 330 may be controlled through rotation of the driving motor according a control signal transmitted from the control unit 530.

According to various embodiments, the third frame 310 may be connected to the outside of the third driving unit 330 to rotate about the third direction Z. The third frame 310 may have a shape of "⊏", and provides a space in which the counterbalance 400 disposed in the inner space of the "⊏" shape is freely rotatable in the state of maintaining the center of gravity without being affected by an external obstacle. As another example, the upper portion of the third frame 310 may be arranged in parallel with the second direction Y and physically restrict the movement range of the counterbalance 400 such that the counterbalance 400 does not deviate from a predetermined angle when rotating about the third direction Z. For example, when the counterbalance 400 rotates beyond 180 degrees through the operation of the first driving unit 130 in order to maintain the horizontality, the center of gravity may be disturbed, and the maintenance of accurate horizontality may not be achieved. In order to prevent such a case, the upper frame may be disposed so as to prevent the counterbalance 400 from rotating beyond 180 degrees, thereby physically preventing the movement described above in advance.

According to various embodiments, the inside of the third frame 310 may be configured as an open passage. For example, the third frame 310 may include various shapes of tunnels extending into the second frame 210, and the printed circuit unit 510 extending from the handle unit 500 may be located inside the tunnels. As another example, the printed circuit unit 510 may transmit power that can drive the third driving unit 330, and may provide a sensor value, a motor signal, or the like transmitted from the control unit 530, so that the third driving unit 330 can perform an operation for maintaining horizontality in real time.

According to various embodiments, the third frame 310 may be fabricated using an aluminum die casting method, an iron plate drawing method, or a plastic injection method.

According to various embodiments, the lower end of the third frame 310 may include a lower support member 312 that can be coupled to the third correction unit 300. The lower support member 312 may be configured in a corresponding shape such that the lower support member 312 is disposed between the third driving unit 330 and the rotary stopper 332 of the third correction unit 300 so as to face the third driving unit 330 and the rotary stopper 332. As another example, the upper end of the third frame 310 may include an upper support member 311 that can be coupled to the second correction unit 200. The upper support member 311 may be configured in a corresponding shape such that the second driving unit 230 of the second correction unit 200 is seated thereon and the upper support member 311 is disposed to face the stationary stopper 231. As described above, the lower end of the third frame 310 is connected to the rotor 330b such that the third frame 310 is rotatable about the third direction Z, and the upper end of the third frame 310 is connected to the stator 230a, thereby serving to support the rotation of other components about the third frame 310.

According to various embodiments, the stoppers 331 and 332 of the third correction unit 300 may restrict the rotation of the third driving unit 330 and may cover the third driving unit 330. The stoppers 331 and 332 may include a stationary stopper 331 disposed at the lower end of the third driving unit 330 and a rotary stopper 332 disposed at the upper end of the third driving unit 330. The stationary stopper 331 may be fixedly coupled to the upper portion of the handle unit 500 and may support the stator 330a therein, and the rotary stopper 332 may enclose and cover the rotator 330b and may rotate simultaneously with the rotor 330b.

For example, according to the supply of power of the control unit, the rotary shaft of the third driving unit 330 is capable of being rotated, and the rotary stopper 332 is also capable of rotating about the third direction Z according to the rotation of the rotor 330b. At this time, a protruding portion of the rotary stopper 332 rotates within the recess in the stationary stopper 331, and cannot rotate beyond the range. Further, the present disclosure is not limited to the above-described configuration, and the rotary stopper 332 may have a recess, and the stationary stopper 331 may have a protrusion to restrict the rotation.

As another example, the stoppers 331 and 332 may protect the lead wire, the shaft, and the rotor, which constitute the third driving unit 330 and may cover the outside of the printed circuit unit 510 connected from the handle unit 500 to the third frame 310 so as to protect the printed circuit unit 510. As another example, the stoppers 331 and 332 form the external appearance of the posture maintaining device 10 for a 360-degree camera, and may be configured in consideration of an aesthetic shape, structure, and precision workability.

Figure 5:
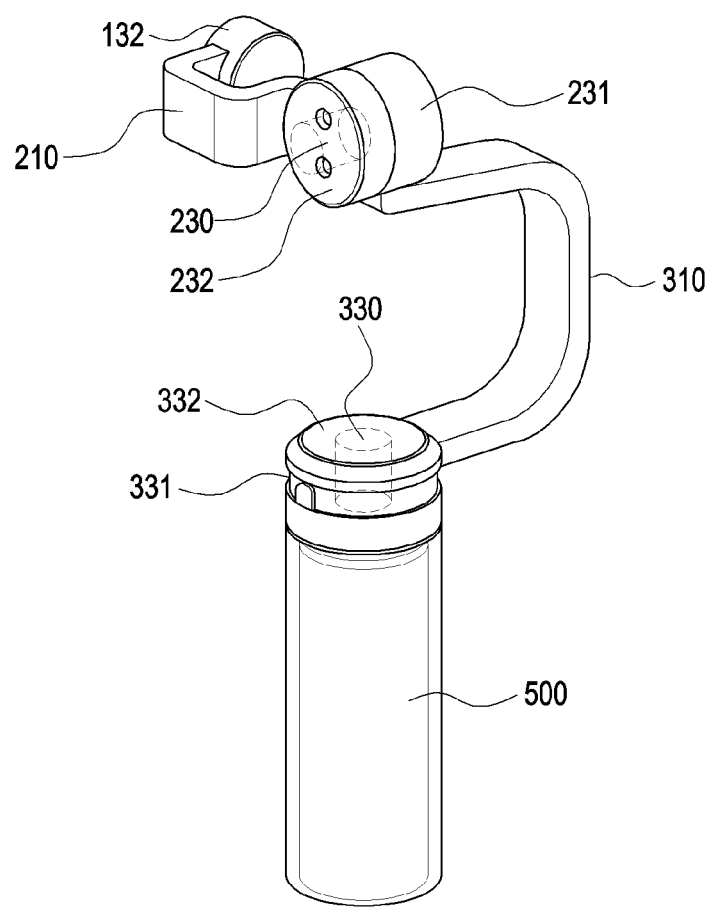
FIG. 5 is a perspective view illustrating a second correction unit connected to the third correction unit of the posture maintaining device for an omnidirectional camera according to an embodiment of the present disclosure.

FIG. 5 is a perspective view illustrating the second correction unit 200 connected to the third correction unit 300 of the posture maintaining device 10 for a 360-degree camera according to an embodiment of the present disclosure.

Referring to FIG. 5, the second correction unit 200 may be disposed above the third correction unit 300. The second correction unit 200 may include the third frame 210 configured to rotate about the second direction Y and the second driving unit 230 configured to drive the second frame 210.

According to various embodiments, the second driving unit 230 is disposed and seated in the upper support member 311 of the third frame 310 and may include a driving motor mounted inside the stoppers 231 and 232 covering the outside so as to practically rotate. The stationary stopper 231 may be fixedly coupled with the end of the third frame 310, and the third driving unit 230 may be fixedly disposed inside the stationary stopper 231.

For example, as the control unit supplies power, the rotary shaft of the second driving unit 230 rotates, and according to the rotation of the second driving unit 230, the second frame 210 may rotate about the second direction (Y axis). At this time, the second driving unit 230 is capable of restricting the rotating angle of the second frame 210 while supporting the rotation of the second frame 210 by the stoppers 231 and 232 disposed in the outside.

In addition, the control unit may sense the movements of the second frame 210 through at least one sensor unit (not illustrated), and may control the rotation of the second driving unit 230 by receiving a control signal for maintaining the horizontality of the camera module C in real time according to sensing signals transmitted from the sensor units and controlling the supply of power of the second correction unit 200. According to the supply of the control power of the control unit 530, the second driving unit 230 may rotate the second frame 210 about the second direction (Y axis) and may also rotate the camera module C, thereby correcting the maintenance of the horizontal posture of the camera module C.

According to various embodiments, the second driving unit 230 is connected to the printed circuit unit 510 (see FIG. 8) for supplying power to the driving motor, and the second driving unit 230, which practically moves, may be sensed through a sensor unit (not illustrated) disposed on the second driving unit 230. For example, the sensor unit mounted on the second frame 210 and the second driving unit 230 may measure the physical quantity or may sense the operation state of the posture maintaining device 10 for a 360-degree camera, and may convert the measured or sensed information into an electrical signal. As one example, the sensor unit may include at least one of a gesture sensor, a gyro sensor, an atmospheric pressure sensor, a magnetic sensor, an acceleration sensor, a proximity sensor, an illuminance sensor, or an ultraviolet (UV) sensor. Accordingly, information sensed by the sensor unit is transmitted to the control unit 530 through the printed circuit unit 510, and the rotational movement of the third driving unit 230 may be controlled through rotation of the driving motor in accordance with a control signal transmitted from the control unit 530.

According to various embodiments, the second frame 210 may be connected to the outside of the second driving unit 230 so as to rotate about the second direction Y. The second frame 210 may have a "⌐" or "⊏" shape and may be formed to surround the upper portion of the counterbalance 400 disposed in the inner space of the "⌐" or "⊏" shape. As another example, the second frame 210 may have a plate of one side arranged in the second direction Y and may physically restrict the movement range of the counterbalance 400 such that the counterbalance 400 does not deviate from a predetermined angle when rotating about the first direction X. For example, when the counterbalance 400 rotates beyond 180 degrees through the operation of the first driving unit 130 in order to maintain the horizontality, the center of gravity may be disturbed, and the maintenance of accurate horizontality may not be achieved. In order to prevent such a case, the frame, which forms one surface at the upper side, may be disposed so as to prevent the counterbalance 400 from rotating beyond 180 degrees, thereby preventing the movement described above. When a part of the third frame 310 described above restricts the movement of the counterbalance 400 in one rotation direction, a part of the second frame 210 may restrict the movement of the counterbalance 400 in the other rotation direction.

According to various embodiments, the inside of the second frame 210 may be configured as an open passage. For example, the second frame 210 may include various shapes of tunnels extending into the first frame 110 or the second frame 210, and the printed circuit unit 510 extending from the handle unit 500 may be located inside the tunnels. For example, the printed circuit unit 510 may transmit power that can drive the second driving unit 230, and may provide a sensor value or a motor signal transmitted from the control unit 530, so that the second driving unit 230 can perform an operation for maintaining horizontality in real time.

According to various embodiments, the second frame 210 may be fabricated using an aluminum die casting method, an iron plate drawing method, or a plastic injection method.

According to various embodiments, the lower end of the second frame 210 may include a lower support member 212 that can be coupled to the second correction unit 200. The lower support member 212 may be configured in a corresponding shape such that the lower support member 212 is disposed between the second driving unit 230 and the rotary stopper 232 of the second correction unit 200 so as to face the second driving unit 230 and the rotary stopper 232. As another example, the upper end of the second frame 210 may include an upper support member 211 that can be coupled to the first correction unit 100. The upper support member 211 may be configured in a corresponding shape such that the first driving unit 130 of the first correction unit 100 is seated thereon and the upper support member 211 is disposed to face the stationary stopper 131. As described above, the lower end of the second frame 210 is connected to the rotor 230b such that the second frame 210 is rotatable about the second direction Y, and the upper end of the second frame 210 is connected to the stator 230a, thereby serving to support the rotation of other components about the second frame 210.

According to various embodiments, the stoppers 331 and 332 of the second correction unit 200 may restrict the rotation of the second driving unit 230 and may cover the second driving unit 230. The stoppers 231 and 232 may include a stationary stopper 231 disposed at the rear end of the second driving unit 230 and a rotary stopper 332 disposed at the front end of the second driving unit 230. The stationary stopper 231 may be fixedly coupled to the upper portion of the third frame 310 and may support the stator 230a therein, and the rotary stopper 232 may enclose and cover the rotator 230b and may rotate simultaneously with the rotor 230b.

For example, according to the supply of power of the control unit, the rotary shaft of the second driving unit 230 is capable of being rotated, and the rotary stopper 232 is also capable of rotating about the second direction Y according to the rotation of the rotor 230b. At this time, a protruding portion of the rotary stopper 232 rotates within the recess in the stationary stopper 231, and cannot rotate beyond the range. Further, the present disclosure is not limited to the above-described configuration, and the rotary stopper 232 may have a recess, and the stationary stopper 231 may have a protrusion to restrict the rotation.

As another example, the stoppers 231 and 232 may protect the lead wire, the shaft, and the rotor, which constitute the second driving unit 230 and may cover the outside of the printed circuit unit 510 connected from the third frame 310 to the second frame 210 so as to protect the printed circuit unit 510. As another example, the stoppers 231 and 232 form the external appearance of the posture maintaining device 10 for a 360-degree camera, and may be configured in consideration of an aesthetic shape, structure, and precision workability.

Figure 6:
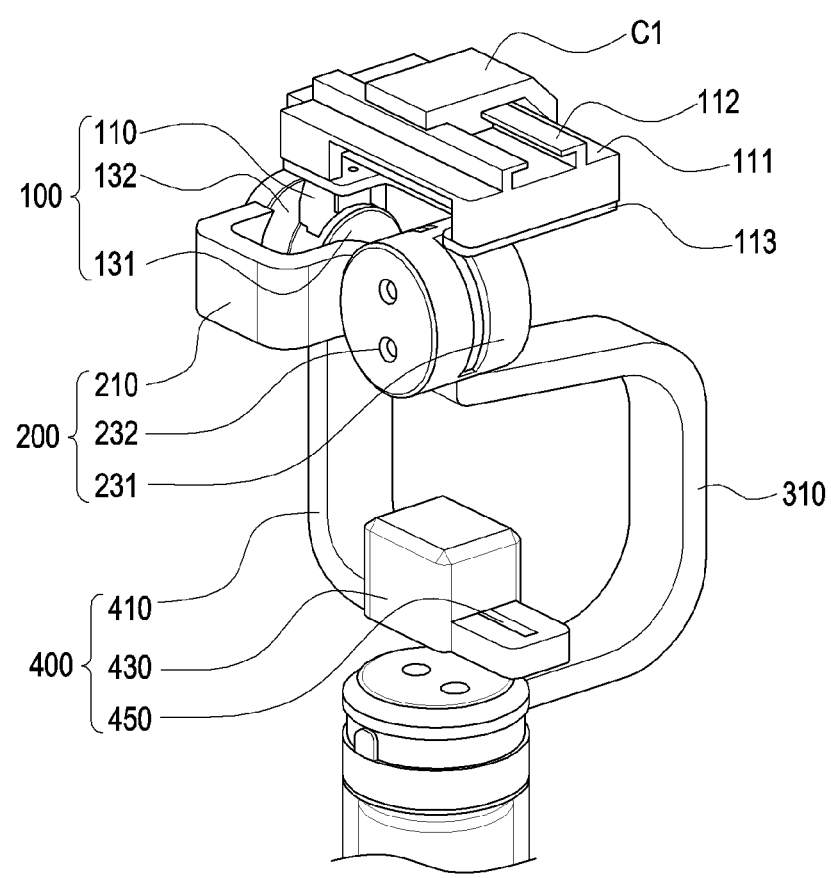
FIG. 6 is a perspective view illustrating a first correction unit connected to the second correction unit of the posture maintaining device for an omnidirectional camera according to an embodiment of the present disclosure.

FIG. 6 is a perspective view illustrating the first correction unit 100 connected to the second correction unit 200 of the posture maintaining device 10 for a 360-degree camera according to an embodiment of the present disclosure.

Referring to FIG. 6, the first correction unit 100 may be disposed above the second correction unit 200. The first correction unit 100 may include the first frame 110 configured to rotate about the first direction X and the first driving unit 130 configured to drive the first frame 110 or the second frame 210.

According to various embodiments, the first driving unit 130 is disposed and seated in the upper support member 211 of the second frame 210 and may include a driving motor mounted inside the stoppers 131 and 132 covering the outside so as to practically rotate. The stationary stopper 131 may be fixedly coupled with the end of the second frame 210, and the first driving unit 130 may be fixedly disposed inside the stationary stopper 131.

For example, as the control unit supplies power, the rotary shaft of the first driving unit 130 rotates, and according to the rotation of the first driving unit 130, the first frame 110 may rotate about the first direction (X axis). At this time, the first driving unit 130 is capable of restricting the rotating angle of the first frame 110 while supporting the rotation of the first frame 110 by the stoppers 131 and 132 disposed in the outside.

In addition, the control unit 530 (see FIG. 8) senses the movement of the first frame 110 through one or more sensor units (not illustrated) and receives a control signal for maintaining the horizontality of the camera module C in real time according to a sensing signal transmitted from the sensor units, and controls the supply of power to the first correction unit 100 so as to control the rotation of the first driving unit 130. Then, the first driving unit 130 is capable of rotating the first frame 210 about the first direction (X axis) according to the supply of the control power of the control unit and is also capable of rotating the camera module C, thereby correcting the maintenance of the horizontal posture of the camera module C.

According to various embodiments, the first driving unit 130 is connected to the printed circuit unit 510 (see FIG. 9) for supplying power to the driving motor, and the first driving unit 130, which practically moves, may be sensed through a sensor unit (not illustrated) disposed on the first driving unit 130. For example, the sensor unit mounted on the first frame 110 and the first driving unit 130 may measure the physical quantity or may sense the operation state of the posture maintaining device 10 for a 360-degree camera, and may convert the measured or sensed information into an electrical signal. As one example, the sensor unit may include at least one of a gesture sensor, a gyro sensor, an atmospheric pressure sensor, a magnetic sensor, an acceleration sensor, a proximity sensor, an illuminance sensor, or an ultraviolet (UV) sensor. Accordingly, information sensed by the sensor unit is transmitted to the control unit 530 through the printed circuit unit 510, and the rotational movement of the first driving unit 130 may be controlled through rotation of the driving motor in accordance with a control signal transmitted from the control unit 530.

According to various embodiments, the first driving unit 130 may be disposed in the inner space of the second frame 210. For example, the first driving unit 130 may be disposed in parallel with a part of the second frame 210, and when a second support member 250 is positioned to face the outside of the posture maintaining device 10 for a 360-degree camera, the first driving unit 130 may be positioned to face the inside of the posture maintaining device 10 for a 360-degree camera so as to face the second support member 250.

According to various embodiments, the first frame 110 may be disposed on the second driving unit 230 with a predetermined gap therebetween and may rotate about the first direction X. However, in the state in which the first frame 110 on which a seat portion 111 of the camera module C is disposed relatively forms a horizontal plane, the second frame 210 or the third frame 310 may rotated about the first direction X with respect to the first frame 110.

According to various embodiments, the first frame 110 may be formed in a "⌐" shape, and the seat portion 111 may be disposed on the upper side of the "⌐" shape. The camera module C may be seated on the seat portion 111, which may include guide rails 112 capable of moving the seated camera module C in the first direction X. The guide rails 112 may be constituted with at least two lines spaced from each other, and each of the lines may be formed in a stepped shape opened to the inside. The step may be fitted to a camera support member C1 configured to support the camera module C so as to be reciprocable in a first direction X.

According to various embodiments of the present disclosure, it is possible to set the center of gravity of the posture maintaining device 10 for a 360-degree camera by adjusting the position of the camera module C moving on the guide rails 112 and the balance weight 430 of the counterbalance 400.

According to various embodiments, the inside of the first frame 110 may be configured as an open passage. For example, the first frame 110 may include various shapes of tunnels extending into the second frame 210 or the third frame 310, and the printed circuit unit 510 extending from the handle unit 500 may be located inside the tunnels. For example, the printed circuit unit 510 may transmit power that can drive the first driving unit 130, and may provide a sensor value or a motor signal transmitted from the control unit 530, so that the first driving unit 130 can perform an operation of maintaining horizontality in real time. As another example, the printed circuit unit 510 is connected to the inside of the guide rails 112 on which the camera module C is seated, so that the position of the camera module C for the center of gravity can be automatically controlled according to a control signal provided from the control unit 530.

According to various embodiments, the first frame 110 may be fabricated using an aluminum die casting method, an iron plate drawing method, or a plastic injection method.

According to various embodiments, the lower end of the first frame 110 may include a lower support member that can be coupled to the first correction unit 100. The lower support member may be configured in a corresponding shape such that the lower support member is disposed between the first driving unit 130 and the rotary stopper 132 of the first correction unit 100 so as to face the first driving unit 130 and the rotary stopper 132. As another example, the upper end of the first frame 110 may be coupled to the seat portion 111. A fixing member 113 may be disposed at the lower end of the seat portion 111, and the first frame 110 and the seat portion 111 may be coupled to each other through a screw C4 or the like. As described above, the lower end of the first frame 110 is connected to the rotor 130b so that the first frame 110, the seat portion 111, and the camera module C are rotatable about the first direction X.

According to various embodiments, the stoppers 131 and 132 of the first correction unit 100 may restrict the rotation of the first driving unit 130 and may cover the first driving unit 130. The stoppers 131 and 132 may include a stationary stopper 131 disposed on the left of the first driving unit 130 and a rotary stopper 132 disposed on the right of the first driving unit 130. The stationary stopper 131 may be fixedly coupled to the upper portion of the second frame 210 and may support the stator 130a therein, and the rotary stopper 132 may enclose and cover the rotator 130b and may rotate simultaneously with the rotor 130b.

For example, according to the supply of power of the control unit, the rotary shaft of the first driving unit 130 is capable of being rotated, and the rotary stopper 132 is also capable of rotating about the first direction X according to the rotation of the rotor 130b. At this time, a protruding portion of the rotary stopper 132 rotates within the recess in the stationary stopper 131, and cannot rotate beyond the range. Further, the present disclosure is not limited to the above-described configuration, and the rotary stopper 132 may have a recess, and the stationary stopper 131 may have a protrusion to restrict the rotation.

As another example, the stoppers 131 and 132 may protect the lead wire, the shaft, and the rotor, which constitute the first driving unit 130 and may cover the outside of the printed circuit unit 510 connected from the second frame 210 to the seat portion 111 so as to protect the printed circuit unit 510. As another example, the stoppers 131 and 132 form the external appearance of the posture maintaining device 10 for a 360-degree camera, and may be configured in consideration of an aesthetic shape, structure, and precision workability.

According to various embodiments, the counterbalance 400 may be disposed under the first driving unit 130. The counterbalance 400 may be disposed in parallel with and to face the seat portion 111, and may include a balance weight 430 for the center of gravity and a slit 450 for guiding the movement of the balance weight in the first direction X.

According to various embodiments, the counterbalance 400 may be connected to the first driving unit 130 and may be rotated about the first direction X by the rotational driving of the first driving unit 130. The frame 410 of the counterbalance 400 may be formed in an "∟" shape, and a slit 450 may be disposed on a lower surface of the "∟" shape. The slit 450 may have a groove shape into which a protruding region of the balance weight 430 can be inserted.

According to various embodiments, the slit 450 may be formed in a long groove shape in the first direction X such that the balance weight 430 can be moved back and forth in the first direction X. The groove in the first direction X correspond to the camera module C movable in the first direction X and is capable of adjusting the center of gravity. For example, the center of gravity may be adjusted differently depending on the weight of the camera module C to be mounted, but may be set to be located at the center of the first driving unit 130 or the second driving 230 so as not to interfere with the driving of the first driving unit 130 or the second driving unit 230.

According to various embodiments, the inside of the counterbalance 400 may be configured as an open passage. For example, the counterbalance 110 may include various shapes of tunnels extending into the first frame 110 or the second frame 210 within the counterbalance 400, and the printed circuit unit 510 (see FIG. 9) extending from the balance weight 430 may be located inside the tunnels. As another example, the printed circuit unit 510 may transmit power that can drive the balance weight 430 in the first direction X, and may transmit, to the counter balance 400, a sensor value or a signal transmitted from the control unit 530 in order to set the center of gravity in correspondence with the movement of the camera module C on the seat portion 111.

According to various embodiments, the material of the counterbalance 400 may be made of the same material as each of the frames 110, 210, and 310 of the posture maintaining device 10 for a 360-degree camera.

Figure 7:
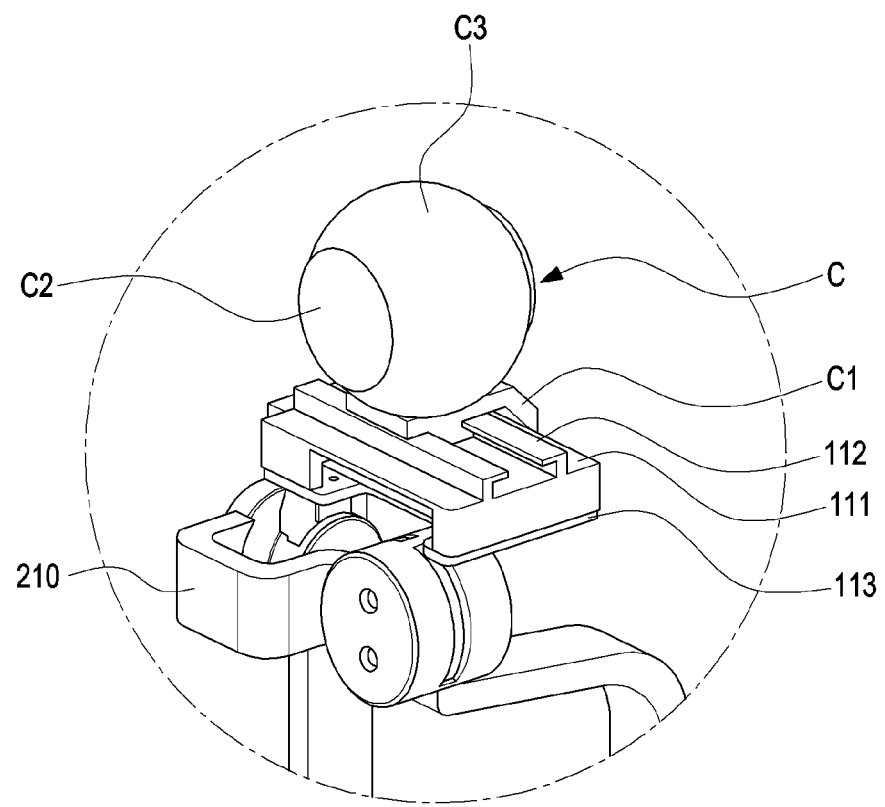
FIG. 7 is a perspective view illustrating a camera module seated on the first correction unit of the posture maintaining device for an omnidirectional camera according to an embodiment of the present disclosure.

FIG. 7 is a perspective view illustrating the camera module C seated on the first correction unit 100 of the posture maintaining device 10 for a 360-degree camera according to an embodiment of the present disclosure.

Referring to FIG. 7, a camera module C movable in the first direction X may be disposed on the seat portion 111 of the first correction unit 100. The camera module C is designed in a spherical or hemispherical shape as a whole, and the entire outer surface of the camera module C may include a camera housing C2 and a base C3. At least a portion of a lens assembly (not illustrated) may be mounted in the housing C2 so as to be protected, and the housing C2 may be made of a transparent glass material for capturing an external image by the lens assembly. The base C3 may form the outer surface of the housing of the camera module C. The base C3 may include a space, in which a part of the lens assembly, an image sensor (e.g., a front sensor or a rear sensor), a printed circuit board, an Image Signal Processor (ISP), a flash (e.g., an LED or a xenon lamp), or the like may be mounted. The base C3 serves to fix and protect the components mounted therein. The outer face of the base C3 may be provided with various buttons for confirming a wired or wireless connection or confirming a connection with an external accessory.

According to various embodiments, the lens assembly is disposed inside the housing C2 and the base C3, and may include at least one wide-angle lens. For example, the wide-angle lens may include various lenses, such as a fisheye lens, an ultra-wide-angle lens, and the like. As another example, the fish-eye lens is an ultra-wide-angle lens having a square angle of more than 180 degrees, and may allow the entire object having a field of view of 180 degrees to be imaged within one circle. The lens assembly may further include an optical member, such as a concave lens or a convex lens, disposed on the light path so as to adjust the focal distance, in addition to the wide-angle lens.

According to various embodiments, a protective member (not illustrated), which is capable of protecting at least some of the lenses of the lens assembly and capable of fixing the wide-angle lens, may be disposed inside the camera housing C2 and outside the lens assembly.

According to various embodiments, the image sensor is disposed inside the base C3, and detects the information of a subject obtained from the lens assembly and converts the information into an electric image signal. For example, a Charge-Coupled Device (CCD) image sensor or a Complementary Metal Oxide Semiconductor (CMOS) image sensor may be used as the image sensor. However, without being limited thereto, other sensor elements, which perform similar functions, may be included.

According to various embodiments, one surface of the image sensor may be disposed to face the lens assembly, and the other surface may be disposed to face the printed circuit board. In addition to an image sensor, the image sensors provided in the camera module C may include an operation recognition sensor for recognizing the user's operation and a voice recognition sensor for recognizing the user's voice. In addition, each of the sensors may sense various kinds of information according to the user's commands and may transmit the sensed information to a control circuit 530 (see, FIG. 1).

According to various embodiments, the printed circuit board is disposed inside the base C3, and various electronic elements may be disposed in the form of Integrated Circuits (ICs). The printed circuit unit may include various elements, such as an image processing element for storing and processing an image captured from the lens assembly. As another example, wired communication terminals, which are connected to the communication unit of the printed circuit unit and are to be connected to external devices through wired connector connection, may be disposed on one surface of the base C3.

According to various embodiments, the base C3 may be made using a reinforced material having high hardness (e.g., high strength plastic, glass, or a metallic material) in order to protect the internal components of the camera module C from an external impact and to prevent the outer face of the camera module C from being scratched. In addition, the base C3 may enhance the external appearance of the camera module C to make the user feel an aesthetic sense.

According to various embodiments, a camera support member C2 may be provided below the camera module C so as to support the camera module C and to make the camera movable along the guide rails 112 of the seat portion 111. A coupling structure having various shapes may be disposed in the upper portion of the camera support member C2 so as to fix the camera module C and the lower portion of the camera support member C2 may be provided with a protrusion to be engaged with the steps of the guide rails 112. The protrusion may be inserted into the steps opened in one direction, so that the camera module C can be moved in the first direction X.

Figure 8:
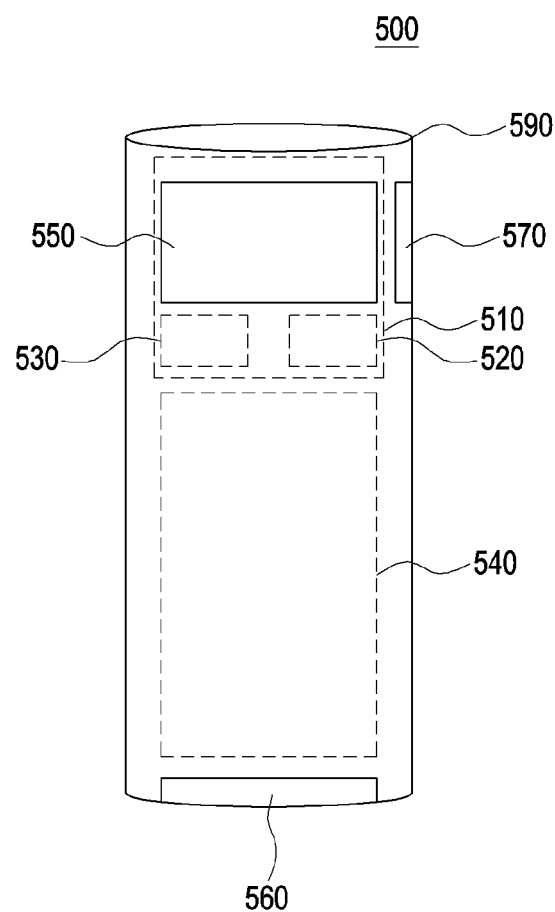
FIG. 8 is a schematic view illustrating the inside and outside of a handle unit according to various embodiments of the present disclosure.

FIG. 8 is a schematic view illustrating the inside and outside of a handle unit 500 according to various embodiments of the present disclosure.

As illustrated in FIG. 8, the handle unit 500 may include a handle housing 590, a portion of the printed circuit unit 510 disposed inside the posture maintaining device 10 for a 360-degree camera as a whole, a power supply 540, a control unit 530, a sensor unit 520, a button unit 570, a display device 550, and the like.

According to various embodiments, the display device 550, the button unit 570, and the connector 560 may be disposed on the outer surface of the handle housing 590 to be exposed.

According to various embodiments, the handle housing 590 is configured to accommodate various electronic components and the like, and at least a portion of the housing 110 may be made of a conductive material. For example, the housing 590 may include sidewalls that form the external surfaces of the electronic device 500 and are configured to fixedly dispose various electronic components thereon, and at least an externally exposed portion of the electronic device 500 may be made of a conductive metal. The printed circuit unit 510 and/or the power supply 540 (e.g., a battery) may be accommodated in the housing 590. For example, a processor, a communication module, various interfaces, a power management module, and the like may be mounted on the printed circuit module 510 in a form of an integrated circuit chip. The control unit 530 (e.g., a control circuit) and the sensor unit 520 (e.g., a sensing circuit) may also be configured as integrated circuit chips to be mounted on the printed circuit unit 510. For example, the control circuit may be a portion of the above-described processor or communication module. The control unit 530 transmits control signals to the first driving unit 130, the second driving unit 230, and the third driving unit 330 so as to control the driving motors and sensors disposed therein in real time and to maintain the module C horizontally even if the user moves. The printed circuit unit 510 may be a flexible printed circuit board.

According to various embodiments, the sensor unit 520 may measure a physical quantity or may sense the operating state of the electronic device 100, and may convert the measured or sensed information into electric signals. At least one of, for example, a gesture sensor, a gyro sensor, an atmospheric pressure sensor, a magnetic sensor, an acceleration sensor, a grip sensor, a proximity sensor, a color sensor (e.g., an RGB sensor), a biometric sensor, a temperature/humidity sensor, an illuminance sensor, and a UV sensor. Additionally or alternatively, the sensor unit 520 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. As another example, the sensor unit 520 may further include a control circuit for controlling one or more sensors included therein.

According to various embodiments, the handle unit 500 may be at least partially made of a material that transmits radio waves or magnetic fields, and may include a display device 550 on the outer surface thereof. For example, a portion of the handle unit 500 may include a window member (not illustrated) made of a tempered glass material and a display device 550 mounted on the inner surface of the window member. A touch panel may be mounted between the window member and the display device 550. For example, the display device 550 may be an output device configured to output a screen, and may be used as an input device provided with a touch screen function.

According to various embodiments, the display device 550 may include, for example, a Liquid Crystal Display (LCD), a Light-Emitting Diode (LED) display, an Organic Light-Emitting Diode (OLED) display, or a MicroElectro-Mechanical System (MEMS) display, or an electronic paper display. The display may display various contents (e.g., text, image, video, icon, or symbol) to, for example, the user. As the touch panel, at least one of, for example, a capacitive type touch panel, a resistive type touch panel, an infrared type touch panel, and an ultrasonic type panel may be used. In addition, the touch panel may further include a control circuit. The touch panel may further include a tactile layer so as to provide a tactile reaction to the user.

According to various embodiments, due to the display device 550, it is possible to determine whether a control signal is transmitted to each of the driving units 110, 210, and 310 (see FIG. 1) in real time and to check a photograph or an image captured by the camera module C. As another example, it is possible to check the capacity of the power supply 540, respective buttons may be disposed on the screen so as to control the operation of the posture maintaining device 10 for a 360-degree camera.

Although not illustrated in detail in the drawings, according to various embodiments, electronic components may be disposed inside the handle unit 500, and various structures may be disposed to be coupled to various components disposed inside the housing 401. For example, a space may be formed in the inner space of the housing 590 so as to accommodate integrated circuit chips mounted on the printed circuit board or the like. The space for accommodating integrated circuit chips may take the form of a recess or may be formed by a rib or the like that surrounds the integrated circuit chips.

According to various embodiments, the power supply 540 is disposed under the printed circuit unit 510 and serves to drive various components in the handle unit or each of the correction units. The power supply 540 may be selected from various types that can be charged with energy and can supply energy, and may be charged in a wired or wireless manner.

According to various embodiments, the power supply 540 may include a Power Management Integrated Circuit (PMIC), a charger Integrated Circuit (IC), or a battery or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The power supply 540 may include, for example, a rechargeable battery and/or a solar battery.

According to various embodiments, a connector 560 for wired charging may be disposed in the lower portion of the handle portion 500. The connector 560 may be configured to include an externally exposed opening and may be directly connected to an external power supply. For example, when the external power supply is connected to the connector 560 via a USB cable or the like, the posture maintaining device 10 for a 360-degree camera can be charged through the power supply 540 having a charging function.

Figure 9:
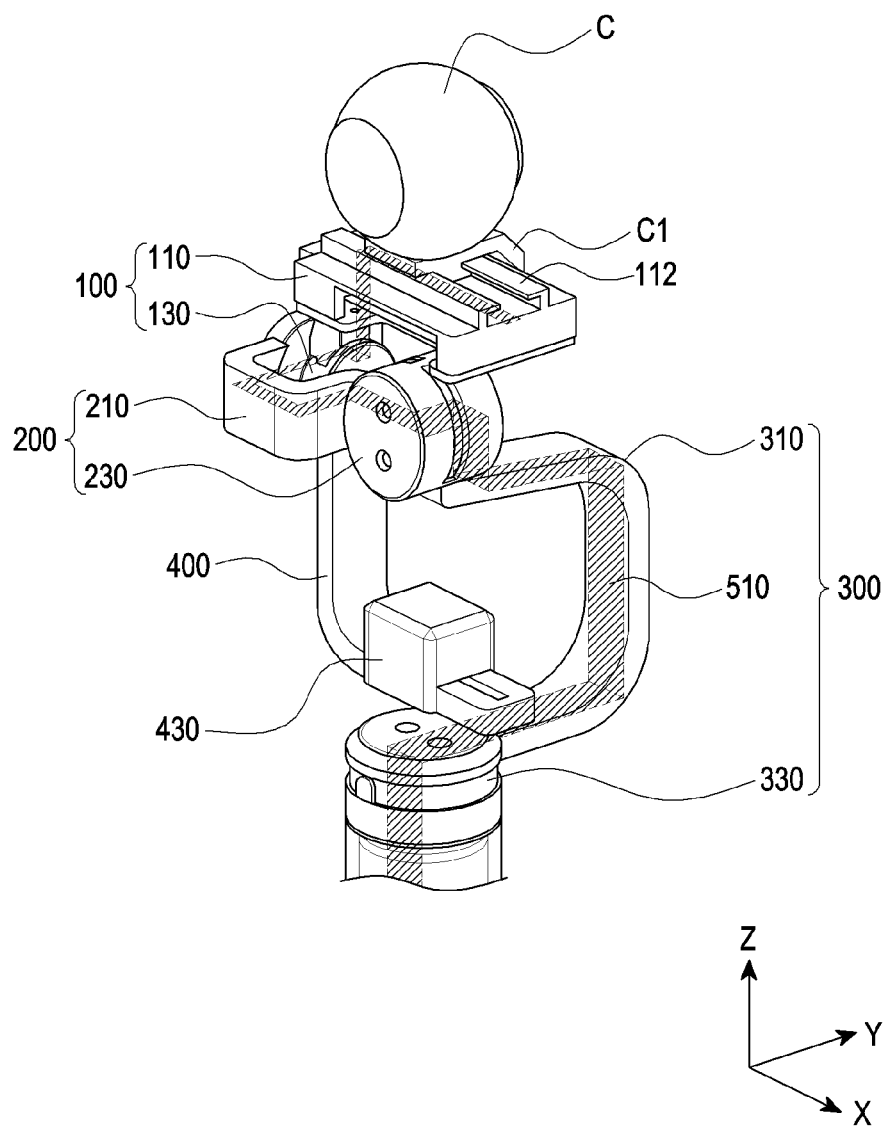
FIG. 9 is a schematic view illustrating a region in which a printed circuit unit is disposed inside the posture maintaining device for an omnidirectional camera according to an embodiment of the present disclosure.

FIG. 9 is a schematic view illustrating a region in which a printed circuit unit 510 is disposed inside the posture maintaining device 10 for a 360-degree camera according to an embodiment of the present disclosure.

As illustrated in FIG. 9, the printed circuit unit 510 connected to the power supply in the handle unit 500 may be disposed inside the first correction unit 100, the second correction unit 200, or the third correction unit 300.

According to a specific embodiment, the printed circuit unit 510 provided in the handle unit 500 may be disposed in the third driving unit 330 of the third correction unit 300 in preference and may transmit power for the rotational movement of the third driving unit 330. For example, in order for the third driving unit 330 to maintain the horizontality of the camera module C in real time, a sensor signal or a driving motor signal provided by the control unit for real-time driving may be transmitted. The third driving unit 330 may rotate about the third direction Z so that the photographing direction of the camera module C can always be directed forward according to the movement of the user.

According to various embodiments, the printed circuit unit 510 connected to the third driving unit 330 may be disposed to pass through the third frame 310 for electrical connection with the second driving unit 230. In the third frame 310, at least one passage connected to the second driving unit 230 may be formed so that the printed circuit unit 510 can be safely disposed therein. In addition, for example, the third frame 310 is formed in a "⊏" shape, and the printed circuit unit 510 disposed therein may be a flexible printed circuit board.

According to various embodiments, the printed circuit unit 510 passing through the third frame 310 may be inserted into the second driving unit 230 to transmit power to the second driving unit 230. For example, in order for the second driving unit 230 to maintain the horizontality of the camera module C in real time, a sensor signal or a driving motor signal provided by the control unit for real-time driving may be transmitted. The second driving unit 230 is rotated about the second direction Y, so that the camera module C can be controlled so as to always maintain the horizontal position against the left-and-right movement of the user during photographing by the camera module C.

As another example, the third driving unit 330 and the second driving unit 230 are connected to each other by the printed circuit unit 510, so that the third driving unit 330 and the second driving unit 230 are capable of preventing the camera module C from being shaken while simultaneously rotating around the third direction Z and the second direction Y, respectively, in response to the movement of the user in real time.

According to various embodiments, the printed circuit unit 510 connected to the second driving unit 230 may be disposed to pass through the second frame 210 for electrical connection with the first driving unit 130. In the second frame 210, at least one passage connected to the first driving unit 130 may be formed so that the printed circuit unit 510 can be safely disposed therein. In addition, for example, the third frame 310 is formed in a "⊏" shape, and the printed circuit unit 510 disposed therein may be a flexible printed circuit board.

According to various embodiments, the printed circuit unit 510 passing through the second frame 210 may be inserted into the first driving unit 130 to transmit power to the first driving unit 130. For example, in order for the first driving unit 130 to maintain the horizontality of the camera module C in real time, a sensor signal or a driving motor signal provided by the control unit for real-time driving may be transmitted. The first driving unit 130 is rotated about the first direction X, so that the camera module C can be controlled so as to always maintain the horizontal position against the front-and-back movement of the user during photographing by the camera module C.

As another example, the third driving unit 330, the second driving unit 230, and the second driving unit 130 are connected to each other by the printed circuit unit 510, so that the third driving unit 330 and the second driving unit 230 are capable of preventing the camera module C from being shaken while simultaneously rotating around the third direction Z, the second direction Y, and the first direction X, respectively, in response to the movement of the user in real time.

According to various embodiments, the printed circuit unit 510 connected to the first driving unit 130 may be disposed to pass through the first frame 110 for electrical connection with the seat portion 111 of the camera module C. In the first frame 110, at least one passage may be formed so that the printed circuit unit 510 can be safely disposed therein. The printed circuit unit 510 disposed therein may be a flexible printed circuit board.

As an example, the first frame 110 is implemented to be manually or automatically movable on the guide rails 112 so that the center of gravity can be maintained in real time.

Figure 10:
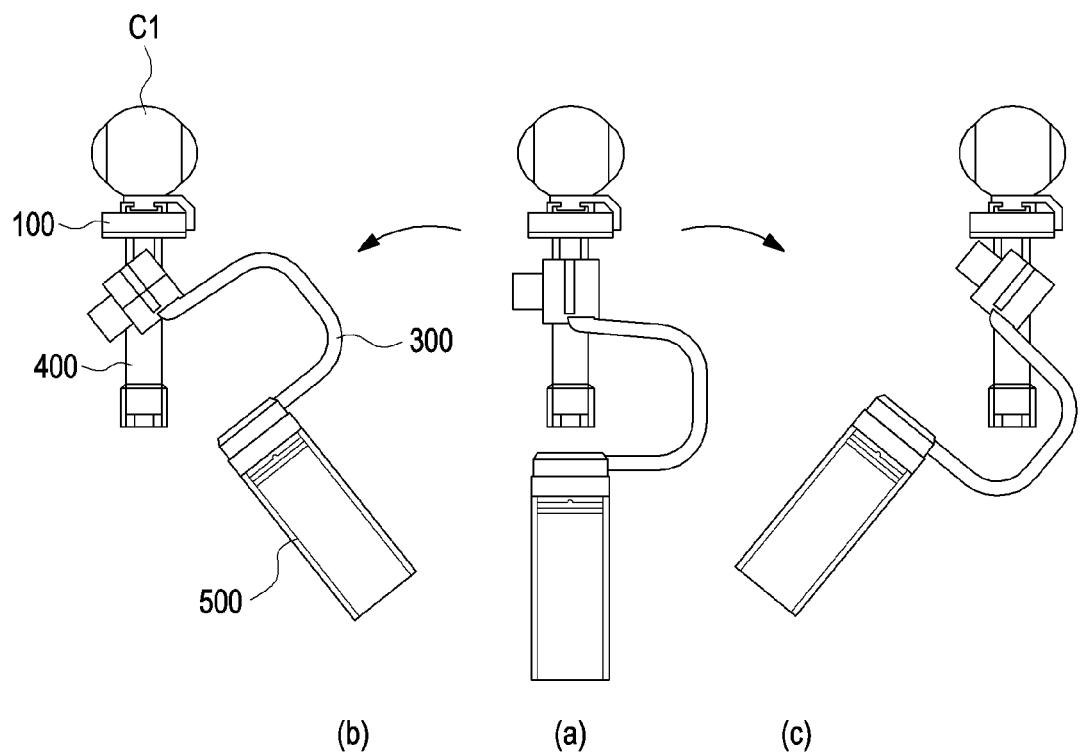
FIG. 10 is a side view illustrating the correction of shaking caused due to the rotation of a first driving unit of the posture maintaining device for an omnidirectional camera according to an embodiment of the present disclosure.

In addition, as an example, although not illustrated in FIG. 10, the printed circuit unit 510 may be disposed within the counterbalance 400 so as to automatically implement the movement of the balance weight 430. The printed circuit unit 510 disposed inside the first frame 110 and the printed circuit unit 510 disposed inside the counterbalance 400 may be controlled to prevent the center of gravity from being disturbed in real time.

FIG. 10 is a side view illustrating the correction of shaking caused due to the rotation of the first driving unit 130 of the posture maintaining device 10 for a 360-direction camera according to an embodiment of the present disclosure. FIG. 10(a) is a side view illustrating the posture maintaining device 10 for a 360-degree camera in a normal posture in which the user grips the handle unit 500, FIG. 10(b) is a side view illustrating the correction of shaking when the user moves the handle 500 backwards toward the user's body, and FIG. 10(c) is a side view illustrating the correction of shaking when the user moves the handle 500 forwards away from the user's body.

As illustrated in FIG. 10, in the state in which the user grips the handle unit 500 of the posture maintaining device 10 for a 360-degree camera, even when the handle unit 500 is shaken according to the user's movement, the camera module C can capture an image while maintaining the horizontality.

According to various embodiments, FIG. 10(b) illustrates a state in which the handle unit 500 forms a predetermined angle towards the user's body when the angle is set with reference to FIG. 10(a). For example, the user may be positioned on the right of the posture maintaining device 10 for a 360-degree camera such that the lens of the camera module C faces the front side or rear side. In this case, the first frame 110, the counterbalance 400, and the camera module C can be maintained in a straight line in the vertical direction (third direction Z) by the rotation of the first driving unit 130 as in FIG. 10(a) (see FIG. 1).

According to various embodiments for explaining the operation of the posture maintaining device 10, when the user grips the handle unit 500 of the posture maintaining device 10 for a 360-degree camera and photographs an external image through the camera module C while moving, first, a sensor unit (not illustrated) may sense the movements (rotated states) of the handle unit 500, the first, second, and third frames 110, 210, and 310, and the camera module C out of a preset value in order to maintain the horizontal posture of the camera module C even when the user moves. In the present embodiment, the movements of the handle unit 500, and the second and third frames 210 and 310 may be detected. The sensor unit may sense the movement of each of the handle unit 500, the first, second, and third frames 110, 210, and 310 or the camera module C in the first, second, and third directions (X axis, Y axis, and Z axis), which are moved according to the user's movement, and may apply a sensed signal to the control unit 530. Based on the sensed signal transmitted thereto, the control unit 530 may supply power required for the correction to the first, second, and third driving units 130, 230, and 330 of the first, second, and third correction units 100, 200, and 300 in order to maintain the horizontal posture of the camera module C.

For example, according to the present embodiment, the control unit 530 may control power supply to the first driving unit 130 so as to cause the first driving unit 130 to rotate about the first direction X, and according to the power supply, the first driving unit 130 may correct the rotation of the camera module C about the first direction X. In addition to the present embodiment, the control unit 530 may control power supply to the second driving unit 230 so as to cause the second driving unit 230 to rotate about the second direction Y, and according to the power supply, the second driving unit 230 may correct the rotation of the camera module C about the second direction Y. In addition, the control unit 530 may control power supply to the third driving unit 330 so as to cause the third driving unit 330 to rotate about the third direction Z, and according to the power supply, the third driving unit 330 may correct the rotation of the camera module C about the third direction Z. Therefore, when the angle of the camera module C may be tilted according to the body motion in addition to the hand shaking while the user photographs or captures moving images, the camera module C can be maintained horizontally without being shaken independently of the user's hand.

Referring to FIG. 10 again, when the handle unit 500 is moved towards the user's body according to the driving operation during photographing (FIG. 10 (b)), the camera module C and the counterbalance 400 can be maintained in the horizontal state by the driving of the first driving unit 130 while the second correction unit 200 and the third correction unit 300 move in the same direction as the handle unit 500. According to a specific embodiment, as the first driving unit 130 rotates counterclockwise about the first direction X, the second correction unit 200, the third correction unit 300, and the handle unit 500 may rotate towards the user's body with respect to the camera module C and the counterbalance 400.

According to various embodiments, FIG. 10(c) illustrates a state in which the handle unit 500 forms at a predetermined angle away from the user's body when the angle is set with reference to FIG. 10(a). In this case, the first frame 110, the counterbalance 400, and the camera module C can be maintained in a straight line in the vertical direction (third direction Z) by the rotation of the first driving unit 130 as in FIG. 10(a).

According to various embodiments, when the handle unit 500 is moved away from the user's body according to the driving operation during photographing, the camera module C and the counterbalance 400 can be maintained in the horizontal state by the driving of the first driving unit 130 while the second correction unit 200 and the third correction unit 300 move in the same direction as the handle unit 500. According to a specific embodiment, as the first driving unit 130 rotates counterclockwise about the first direction X, the second correction unit 200, the third correction unit 300, and the handle unit 500 may rotate towards the user's body with respect to the camera module C and the counterbalance 400.

According to various embodiments, the camera module C is capable of performing omnidirectional photographing (360 degree-photographing), and may be implemented such that the second correction unit 200 and the third correction unit 300 move only in a predetermined space below the camera module C so as to prevent the omnidirectional angle of view of the camera module C, which is obtained according to shaking correction, from being interfered. For example, since all the components of the posture maintaining device 10 for a 360-degree camera are disposed under the camera module C and rotate within a predetermined angle, the user is capable of performing photographing without interference.

Hereinafter, a case where the shaking of the camera module C is corrected in the left-and-right direction in addition to the front-and-back direction of the posture maintaining device 10 for a 360-degree camera will be described.

Figure 11:
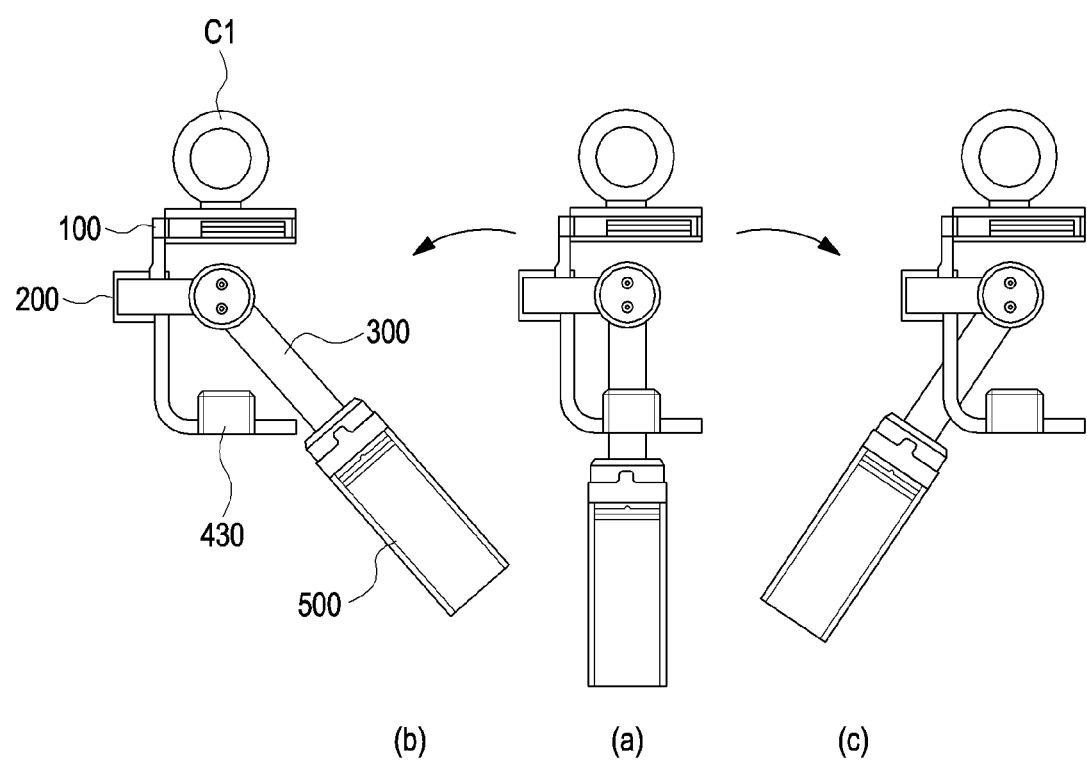
FIG. 11 is a side view illustrating the correction of shaking caused due to the rotation of a second driving unit of the posture maintaining device for an omnidirectional camera according to an embodiment of the present disclosure.

FIG. 11 is a side view illustrating the correction of shaking caused due to the rotation of the second driving unit 230 of the posture maintaining device 10 for a 360-direction camera according to an embodiment of the present disclosure. FIG. 11(a) is a side view illustrating the posture maintaining device 10 for a 360-degree camera in a normal posture in which the user grips the handle unit 500, FIG. 11(b) is a side view illustrating the correction of shaking when the user moves the handle 500 to the leftwards from the user, and FIG. 11(c) is a side view illustrating the correction of shaking when the user moves the handle 500 to the rightwards from the user.

As illustrated in FIG. 11, in the state in which the user grips the handle unit 500 of the posture maintaining device 10 for a 360-degree camera, even when the handle unit 500 is shaken according to the user's movement, the camera module C can capture an image while maintaining the horizontality.

According to various embodiments, FIG. 11(b) illustrates a state in which the handle unit 500 forms a predetermined angle leftwards from the user when the angle is set with reference to FIG. 11(a). For example, the user may be positioned in front of or behind the posture maintaining device 10 for a 360-degree camera such that the lens of the camera module C faces the front side or rear side. In this case, the first frame 110, the counterbalance 400, and the camera module C can be maintained in a straight line in the vertical direction (third direction Z) by the rotation of the second driving unit 230 as in FIG. 11(a). For example, when the angle of the camera module C may be tilted according to the body motion in addition to the hand shaking while the user photographs or captures moving images, the camera module C can be maintained horizontally without being shaken independently of the user's hand (see FIG. 1).

According to various embodiments for explaining the operation of the posture maintaining device 10, when the user grips the handle unit 500 of the posture maintaining device 10 for a 360-degree camera and photographs an external image through the camera module C while moving, first, a sensor unit (not illustrated) may sense the movements (rotated states) of the handle unit 500, the first, second, and third frames 110, 210, and 310, and the camera module C out of a preset value in order to maintain the horizontal posture of the camera module C even when the user moves. In the present embodiment, the movements of the handle unit 500 and the third frame 310 may be detected. The sensor unit may sense the movement of each of the handle unit 500, the first, second, and third frames 110, 210, and 310 or the camera module C in the first, second, and third directions (X axis, Y axis, and Z axis), which are moved according to the user's movement and may apply a sensed signal to the control unit 530. Based on the sensed signal transmitted thereto, the control unit 530 may supply power required for the correction to the first, second, and third driving units 130, 230, and 330 of the first, second, and third correction units 100, 200, and 300 in order to maintain the horizontal posture of the camera module C.

For example, according to the present embodiment, the control unit 530 may control power supply to the second driving unit 230 so as to cause the second driving unit 230 to rotate about the second direction Y, and according to the power supply, the second driving unit 230 may correct the rotation of the camera module C about the second direction Y. In addition to the present embodiment, the control unit 530 may control power supply to the first and third driving units 130 and 330 so as to cause the first and third driving units 130 and 330 to rotate about the first and third directions (X and Z axes), and according to the power supply, the first and third driving units 130 and 330 may correct the rotation of the camera module C about the first and third directions (X and Z axes). Therefore, when the angle of the camera module C may be tilted according to the body motion in addition to the hand shaking while the user photographs or captures moving images, the camera module C can be maintained horizontally without being shaken independently of the user's hand.

According to various embodiments, when the handle unit 500 is moved counterclockwise from the user according to the driving operation during photographing, the camera module C and the counterbalance 400 can be maintained in the horizontal state by the driving of the second driving unit 230 while the third correction unit 300 moves in the same direction as the handle unit 500. According to a specific embodiment, as the second driving unit 230 rotates counterclockwise about the second direction Y, the third correction unit 300 and the handle unit 500 may rotate counterclockwise from the user with respect to the camera module C and the counterbalance 400.

According to various embodiments, FIG. 11(c) illustrates a state in which the handle unit 500 forms a predetermined angle in the clockwise from the user when the angle is set with reference to FIG. 11(a). In this case, the first frame 110, the counterbalance 400, and the camera module C can be maintained in a straight line in the vertical direction (third direction Z) by the rotation of the first driving unit 130 as in FIG. 9(a).

According to various embodiments, when the handle unit 500 is moved clockwise from the user according to the driving operation during photographing, the camera module C and the counterbalance 400 can be maintained in the horizontal state by the driving of the second driving unit 230 while the third correction unit 300 moves in the same direction as the handle unit 500. According to a specific embodiment, as the second driving unit 230 rotates clockwise about the second direction Y, the third correction unit 300 and the handle unit 500 may rotate clockwise from the user with respect to the camera module C and the counterbalance 400.

According to various embodiments, the camera module C is capable of performing omnidirectional photographing (360 degree-photographing), and may be implemented such that the third correction unit 300 move only in a predetermined space below the camera module C so as to prevent the omnidirectional angle of view of the camera module C, which is obtained according to shaking correction, from being interfered. For example, since all the components of the posture maintaining device 10 for a 360-degree camera are disposed under the camera module C and rotate within a predetermined angle, the user is capable of performing photographing in real time without interfering with the view angle region of the camera module C.

Figure 12:
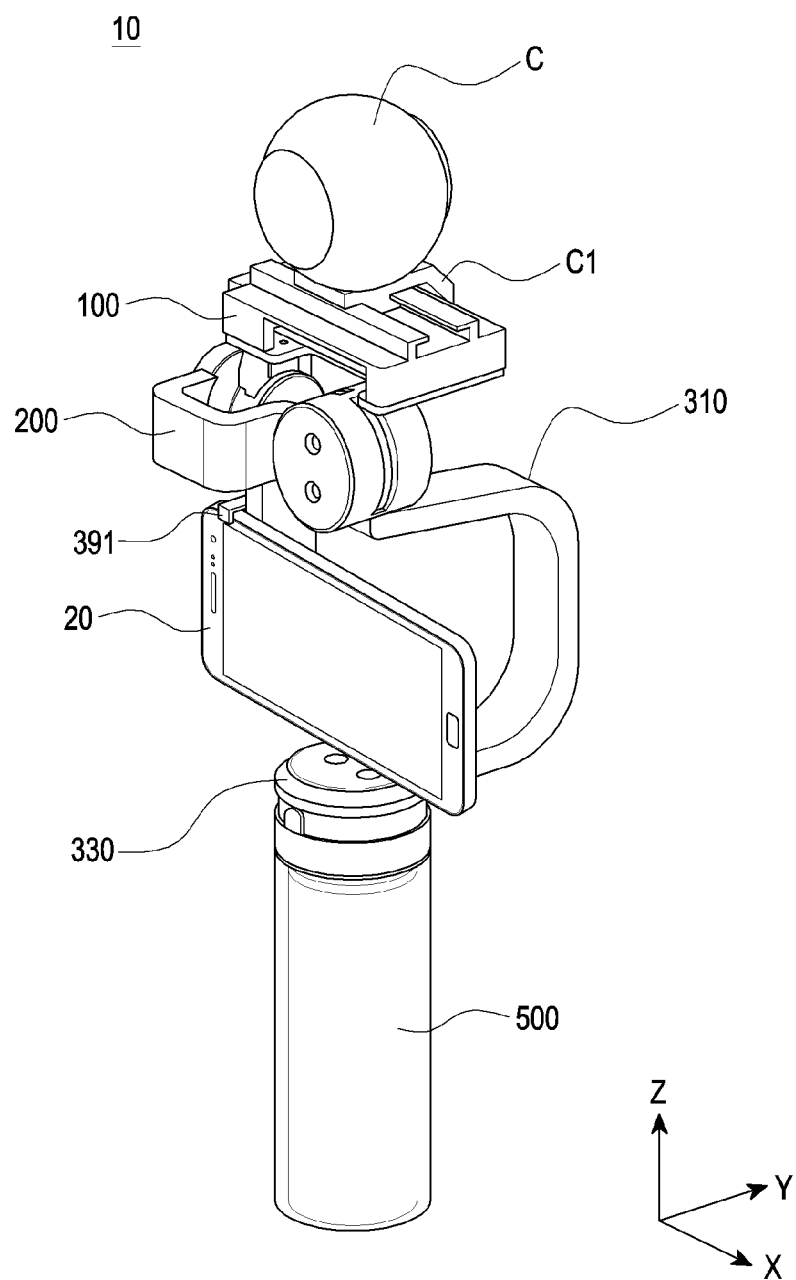
FIGS. 12 and 13 are perspective views illustrating a posture maintaining device for a 360-degree camera, on which a portable electronic device according to various embodiments of the present disclosure is mounted.
Figure 13:
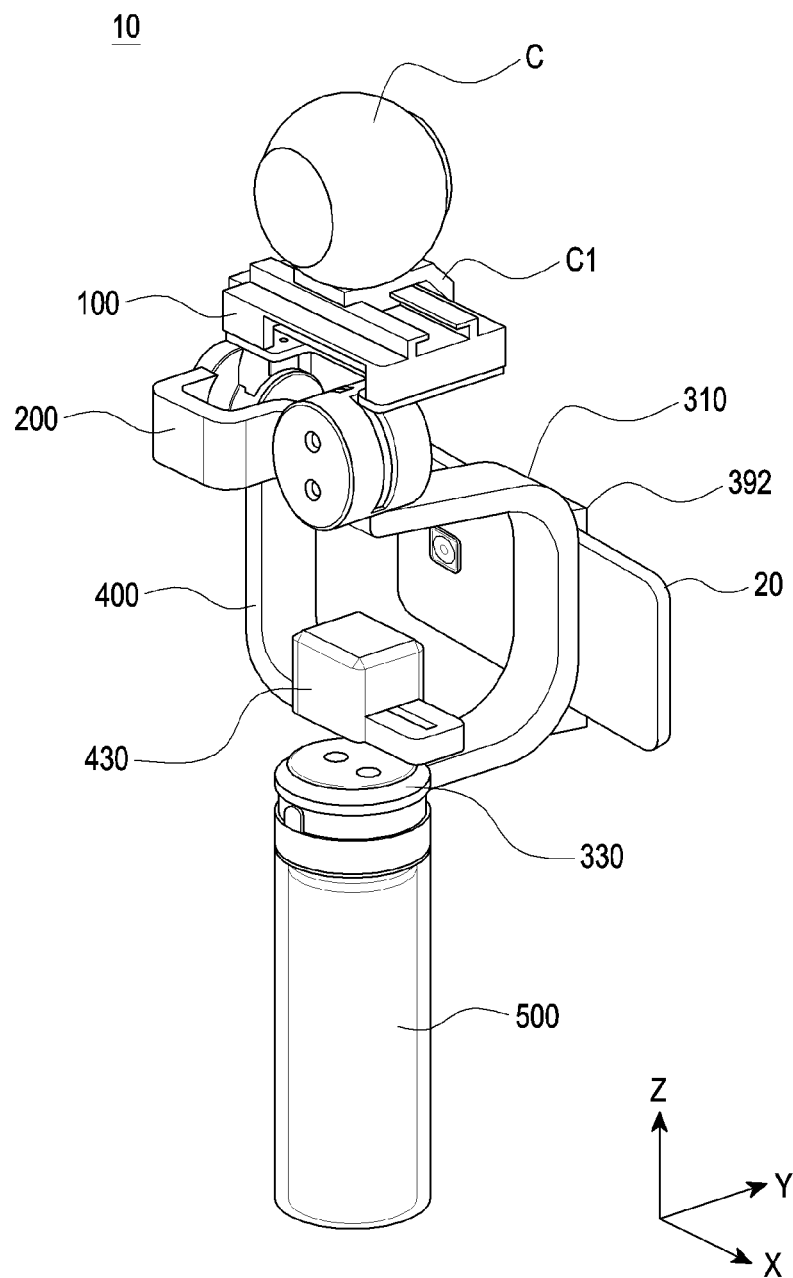

FIGS. 12 and 13 are perspective views illustrating a posture maintaining device 10 for a 360-degree camera, on which a portable electronic device 20 according to various embodiments of the present disclosure is mounted.

Referring to FIG. 12, an engagement member 391 may be disposed on one side of the counterbalance 400 of the posture maintaining device 10 for a 360-degree camera so as to mount an external electronic device 20. For example, the external electronic device 20 may be a portable electronic device such as a smart phone or a wearable device.

According to various embodiments, the engagement member 391 may employ various types of engagement methods capable of fixing the external electronic device 20. The external electronic device 20 can be mounted on the engagement member 391 so as to check and store photographs or images captured through the camera module C in real time. As another example, the external electronic device 20 disposed on the counterbalance 400 side is normally horizontally maintained according to the movement of the user like the camera module C, so that the user can view a screen without blur in real time.

According to various embodiments, connection between the external electronic device 20 and the camera module C or the posture maintaining device 10 for a 360-degree camera may be made in a wired or wireless manner. For example, the posture maintaining device 10 for a 360-degree camera may transmit an image captured by the camera module C and/or position information detected by the sensor unit to the external electronic device 20 via a network. The network may include, but not exclusively, a mobile or cellular network, a Local Area Network (LAN), a Wireless Local Area Network (WLAN), a Wide Area Network (WAN), the Internet, a Small Area Network (SAN), etc.

The wireless communication may use at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. In addition, the wireless communication may include, for example, short range communication. The short-range communication 164 may include at least one of, for example, Wireless Fidelity (WiFi), Bluetooth, Near Field Communication (NFC), and Global Navigation Satellite System (GNSS). The network 162 may include a telecommunication network (e.g., at least one of a computer network (e.g., LAN or WAN), the internet, and a telephone network).

Although not illustrated in detail in the drawings, according to various embodiments, the external electronic device 20 mounted on the engagement member 391 may serve as a counterbalance by itself. However, the present disclosure is not limited thereto, and a balance weight (not illustrated) may be disposed under the engagement member 391 so as to maintain the center of gravity in accordance with the movement of the camera module C, so that the horizontality can be maintained even if the posture maintaining device 10 for a 360-degree camera is moved back and forth, and up and down.

Referring to FIG. 13, according to various embodiments, an engagement member 392 may be disposed on one side of the third frame 310 of the posture maintaining device 10 for a 360-degree camera so as to mount an external electronic device 20. For example, the external electronic device 20 may be a portable electronic device such as a smart phone or a wearable device.

Since the correction of shaking and the configuration of the external electronic device 20 mounted on the engagement member 392 according to FIG. 13 are the same as those of the above embodiment, a description thereof will be omitted.

Hereinafter, a driving method of the posture maintaining device 10 for a 360-degree camera will be described.

Figure 14:
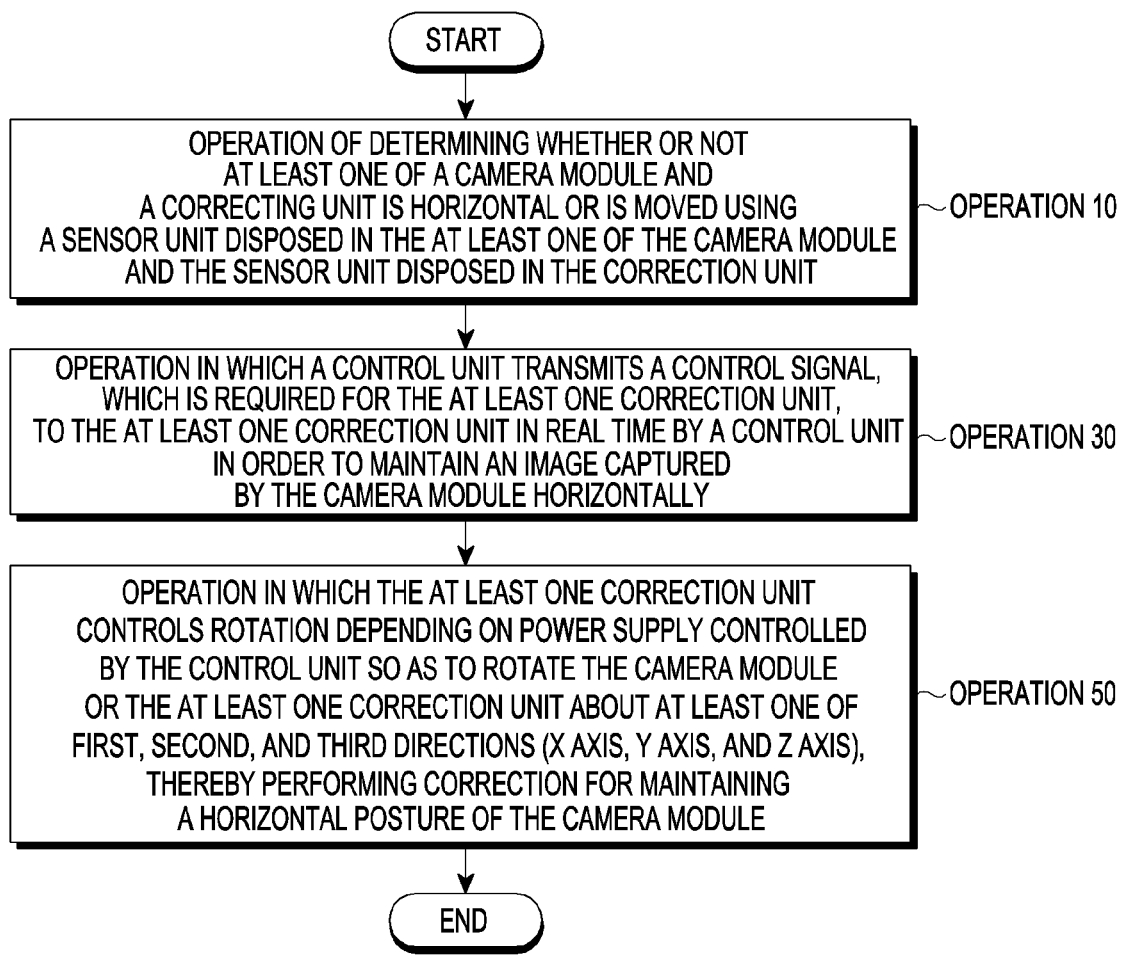
FIG. 14 is a flowchart illustrating a driving method for the posture maintaining device for an omnidirectional camera according to an embodiment of the present disclosure.

FIG. 14 is a flowchart illustrating a driving method of a posture maintaining device 10 for a 360-degree camera according to an embodiment of the present disclosure.

According to an embodiment of the present disclosure, the control unit 530 (see FIG. 1) included in the posture maintaining device 10 may include instructions for operating a processor. For example, the control unit 530 may include instructions that allow the processor to control the internal components of the posture maintaining device 10 and to cooperate with other electronic devices 20 (see FIG. 12). The processor may control the internal components of the posture maintaining device 10 based on the instructions stored in the control unit 530, and may cooperate with other electronic devices 20 (external electronic devices) or servers. Hereinafter, the operation of the posture maintaining device 10 will be described with respect to each component of the posture maintaining device 10.

In the embodiment of the present disclosure, a camera, a sensor unit, a control unit, a driving unit, and a handle unit may respectively mean the camera unit C, the control unit 530, the sensor unit 520, the driving units 130, 230, and 330, and the handle unit 500 of FIGS. 1 to 3. In addition, in the embodiment of the present disclosure, the "X-axis direction" may refer to a first direction X, and the "Y-axis direction" may refer to as a second direction Y, and the "Z-axis direction" may refer to a third direction Z.

As illustrated in FIG. 14, according to operation 10, the control unit 530 may perform an operation of determining whether or not at least one of the driving unit and the camera module is horizontally disposed or moved using a sensor unit disposed in at least one posture maintaining device 10.

According to various embodiments, at least one sensor unit 520 may be included in the driving units 130, 230, and 330, the frames 110, 210, and 310, the handle unit 500, or the camera module C. The sensor unit 520 may measure a physical quantity or may sense the operating state of each electronic device configured in the posture maintaining device, and may convert the measured or sensed information into electric signals. At least one of, for example, a gesture sensor, a gyro sensor, an atmospheric pressure sensor, a magnetic sensor, an acceleration sensor, a grip sensor, a proximity sensor, a color sensor (e.g., an RGB sensor), a biometric sensor, a temperature/humidity sensor, an illuminance sensor, and a UV sensor. Additionally or alternatively, the sensor unit 520 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor.

The sensor unit may sense the movement of each of the handle 500, the driving units 130, 230, and 330, the frames 110, 210, and 310 or the camera module C in the first, second, and third directions X, Y, and Z, which are moved according to the user's movement, and may apply a sensed signal to the control unit 250. For example, when camera shaking occurs while taking a photograph or capturing a moving image with the camera module C, a position signal deviating from a predetermined horizontal position may be provided to at least one process of the control unit 530. As another example, when the movement of the first driving unit 130 is changed according to the movement of the user, the sensor unit 520 operates to transmit a signal corresponding to the changed position of the first driving unit 130 from the preset position to the control unit 530. The at least one process of the control unit 530 may receive a signal indicating whether or not it is horizontal and whether or not it is moved. As another example, when the movement of the second driving unit 230 or the third driving unit 330 is changed according to the movement of the user, the sensor unit 520 operates to transmit a signal corresponding to the changed position of the second driving unit 230 or the third driving unit 330 from the preset position to the control unit 530. The at least one process of the control unit 530 may receive a signal indicating whether or not it is horizontal and whether or not it is moved.

Thereafter, according to operation 30, the control unit 520 may perform an operation of transmitting a control signal necessary for the one or more correction units 100, 200, and 300 in real time to the one or more correction units 100, 200, and 300 in order to maintain the image captured by the camera module C horizontally.

In addition, according to operation 50, the one or more correction units 100, 200, and 300 may perform an operation of correction for maintaining the horizontal posture of the camera module C by controlling rotation according to controlled power supply and rotating the camera module C or the one or more correction units 100, 200, and 300 in at least one of the first, second, and third directions (X axis, Y axis, and Z axis).

According to various embodiments, the driving units 130, 230, and 330 may include a first driving unit 130 rotatable about the first direction X, a second driving unit 230 rotatable about the second direction Y, and a third driving unit 330 rotatable about the third direction Z.

For example, when the control unit causes the power supply to supply required power to the first driving unit 130, the first driving unit 130 may receive a signal (e.g., power) capable of operating the camera module C or the first frame 110 to maintain horizontality. In addition, when the camera shake occurs again during photographing a photograph or a moving image with the camera module C, a position signal deviating from a predetermined horizontal position may be provided to at least one process of the control unit 530.

According to various embodiments, the first driving unit 130 may perform an operation of rotating the second frame 210 about the first direction X. For example, the control unit 530 may transmit a control signal for maintaining the horizontality of the camera module C or the first frame 110 to the first driving unit 130. When the camera module C or the first frame rotates clockwise about the first direction X about 15 degrees due to the user's motion, the control unit 530 may transmit a control signal (first signal) to the first driving unit 130 such that the first driving unit 130 rotates counterclockwise about 15 degrees about the first direction X. According to the operation, the camera module C or the first frame 110 can be horizontally maintained in real time, and the camera module C can capture an image without blur.

According to various embodiments, when power is supplied to the second driving unit 230 or the third driving unit 330 by the power supply like the first driving unit 130 or the camera module C, the second driving unit 230 or the third driving unit 330 may operate to maintain the horizontality according to a preset signal.

For example, the second driving unit 230 may perform an operation of rotating the second frame 210 or the third frame 310 about the second direction Y. For example, the control unit 530 may transmit a control signal for maintaining the horizontality of the camera module C or the first frame 110 to the second driving unit 230. When the camera module C or the first frame rotates clockwise about the second direction Y about 15 degrees due to the user's motion, the control unit 530 may transmit a control signal (second signal) to the second driving unit 230 such that the second driving unit 230 rotates counterclockwise about 15 degrees about the second direction Y. According to the operation, the camera module C or the first frame 110 can be horizontally maintained in real time, and the camera module C can capture an image without blur.

As another example, the third driving unit 330 may perform an operation of rotating the third frame 310 about the third direction Z. The operation of the third driving unit 330 allows the camera module C to capture an image without blur, like the first driving unit 130 or the second driving unit 230.

According to various embodiments, the operations of the camera module C, the first driving unit 130, the second driving unit 230, and the third driving unit 330 may be simultaneously performed in real time. As another example, a position signal sensed by the sensor unit 520 disposed in the camera module C, the first driving unit 130, the second driving unit 230, or the third driving unit 330 may be simultaneously transmitted to the control unit 530.

According to an embodiment of the present disclosure, a posture maintaining device for a 360-degree camera may include: a first correction unit including a seat portion, on which a camera module having a 360-degree view angle is seated, and configured to be rotatable about a first direction; a second correction unit disposed on one side of the first correction unit, and configured to be rotatable about a second direction different from the first direction; a third correction unit disposed at a lower end of the second correction unit, and configured to be rotatable about a third direction different from the first direction or the second direction; and a counterbalance connected to the first correction module, and configured to guide maintenance of horizontality of the camera.

According to an embodiment of the present disclosure, the seat portion is disposed on an upper portion of the first correction unit, and the first direction of the first correction unit, the second direction of the second correction unit, and the third direction of the third correction unit may be orthogonal to each other.

According to an embodiment of the present disclosure, the counterbalance may include a balance weight for a center of gravity, which is disposed at least partially below the seat portion to be parallel with the seat portion; and a slit configured to guide a movement of the balance weight in the first direction.

According to an embodiment of the present disclosure, the first correction unit may include a first frame configured to guide a movement of the camera in the first direction, and a first driving unit configured to rotate the first frame or a second driving unit about the first direction.

According to an embodiment of the present disclosure, the counterbalance may be connected to the first driving unit, and may be rotatable about the first direction simultaneously with the first frame.

According to an embodiment of the present disclosure, the second correction unit may include a second frame disposed outside the first driving unit, and the second driving unit configured to rotate the second frame or a third driving unit about the second direction.

According to an embodiment of the present disclosure, the first driving unit and the second driving unit may be arranged in a straight line in the first direction.

According to an embodiment of the present disclosure, the third correction unit may include a third frame disposed below the second driving unit, and the third driving unit configured to rotate the third frame about the third direction.

According to an embodiment of the present disclosure, the second driving unit and the third driving unit may be arranged in a straight line in the third direction.

According to an embodiment of the present disclosure, the third frame may form a line at least partially parallel to the second direction and the third direction so as to define a range of rotation angle corresponding to a rotational movement of the counterbalance and to protect a movement path.

According to an embodiment of the present disclosure, the posture maintaining device may further include a handle unit rotatably disposed under the third correction unit so as to allow a user to perform photographing while carrying the horizontal posture maintaining device.

According to an embodiment of the present disclosure, the handle unit may include a handle housing, a power supply disposed inside the housing and configured to store electric power so as to supply the electric power to the first correction unit, the second correction unit, or the third correction unit; and a control unit configured to control the rotational movement of the first correction unit, the second correction unit, or the third correction unit in real time.

According to an embodiment of the present disclosure, a printed circuit unit may be partially disposed inside the handle unit, and may be connected to the first driving unit, the second driving unit, and the third driving unit so as to supply electric power and to control driving.

According to an embodiment of the present disclosure, the printed circuit unit may include a flexible printed circuit board and may extend mutually through openings disposed in the first frame, the second frame, and the third frame.

According to an embodiment of the present disclosure, at least one engagement portion may be disposed on one side of the third frame or one side of the counterbalance to be engaged with an external portable device.

According to an embodiment of the present disclosure, the first driving unit, the second driving unit, and the third driving unit may further include a sensor unit therein so as to sense a movement of the first driving unit, the second driving unit, and the third driving unit in real time during photographing by the camera.

According to an embodiment of the present disclosure, the control unit controls power supply for rotation to the first driving unit, the second driving unit, or the third driving unit in response a sensing signal transmitted from the sensor unit in order to control maintenance of horizontality of the camera.

According to an embodiment of the present disclosure, a driving method of a posture maintaining device for a 360-degree camera may perform: an operation of determining whether or not at least one of a camera module and a correction unit is horizontal or is moved using a sensor unit disposed in the at least one of the camera module and the sensor unit disposed in the correction unit; an operation in which a control unit transmits a control signal, which is required for the at least one correction unit, to the at least one correction unit in real time by a control unit in order to maintain an image captured by the camera module horizontally; and an operation in which the at least one correction unit controls rotation depending on power supply controlled by the control unit so as to rotate the camera module or the at least one correction unit about at least one of first, second, and third directions (X axis, Y axis, and Z axis), thereby performing correction for maintaining a horizontal posture of the camera module.

According to an embodiment of the present disclosure, in the operation of transmitting the control signal, which is required for the at least one correction unit, at least one of an operation of transmitting a first signal to a first driving unit configured to rotate about a first direction, an operation of transmitting a second signal to a second driving unit to a second driving unit configured to rotate about a second direction, and an operation of transmitting a third signal to a third driving unit configured to rotate about a third direction may be performed.

According to an embodiment of the present disclosure, in the operation in which the at least one driving unit performs a rotational movement for maintaining horizontality according to the control signal, the first driving unit may perform an operation of rotating a second frame about the first direction, or the second driving unit may perform an operation of rotating the second frame or a third frame about the second direction.

It may be apparent to a person ordinarily skilled in the technical field to which the present disclosure belongs, that the above-mentioned posture maintaining device for a 360-degree camera and an operation method thereof according to various embodiments of the present disclosure are not limited by the above-mentioned embodiments and drawings, and may be variously substituted, modified, and changed within the technical scope of the present disclosure.

The invention claimed is:

1. A horizontal posture maintaining device comprising:
a first correction unit including a seat portion, on which a camera module is seated, and configured to be rotatable about a first direction;
a second correction unit disposed on one side of the first correction unit, and configured to be rotatable about a second direction different from the first direction;
a third correction unit disposed at a lower end of the second correction unit, and configured to be rotatable about a third direction different from the first direction or the second direction; and
a counterbalance connected to the first correction module, and configured to guide maintenance of horizontality of the camera module,
wherein the seat portion is disposed on an upper portion of the first correction unit, and the first direction of the first correction unit, the second direction of the second correction unit, and the third direction of the third correction unit are orthogonal to each other, and
wherein the counterbalance includes a balance weight for a center of gravity, which is disposed at least partially below the seat portion to be parallel with the seat portion; and a slit configured to guide a movement of the balance weight in the first direction.

2. The horizontal posture maintaining device of claim 1, wherein the first correction unit includes a first frame configured to guide a movement of the camera module in the first direction, and a first driving unit configured to rotate the first frame or a second driving unit about the first direction.

3. The horizontal posture maintaining device of claim 2, wherein the counterbalance is connected to the first driving unit, and is rotatable about the first direction simultaneously with the first frame.

4. The horizontal posture maintaining device of claim 2, wherein the second correction unit includes a second frame disposed outside the first driving unit, and the second driving unit configured to rotate the second frame or a third driving unit about the second direction, and
the first driving unit and the second driving unit are arranged in a straight line in the first direction.

5. The horizontal posture maintaining device of claim 4, wherein the third correction unit includes a third frame disposed below the second driving unit, and the third driving unit configured to rotate the third frame about the third direction, and
the second driving unit and the third driving unit are arranged in a straight line in the third direction.

6. The horizontal posture maintaining device of claim 5, wherein the third frame forms a line at least partially parallel to the second direction and the third direction so as to define a range of rotation angle corresponding to a rotational movement of the counterbalance and to protect a movement path.

7. The horizontal posture maintaining device of claim 6, further comprising:
a handle unit rotatably disposed under the third correction unit so as to allow a user to perform photographing while carrying the horizontal posture maintaining device,
the handle unit includes a handle housing, a power supply disposed inside the housing and configured to store electric power so as to supply the electric power to the first correction unit, the second correction unit, or the third correction unit; and a control unit configured to control the rotational movement of the first correction unit, the second correction unit, or the third correction unit in real time.

8. The horizontal posture maintaining device of claim 7, further comprising:
a printed circuit unit, which is partially disposed inside the handle unit and is connected to the first driving unit, the second driving unit, and the third driving unit so as to supply electric power and to control rotational driving,
wherein the printed circuit unit includes a flexible printed circuit board and extends mutually through openings disposed in the first frame, the second frame, and the third frame.

9. The horizontal posture maintaining device of claim 7, further comprising:
at least one engagement portion is disposed on one side of the third frame or one side of the counterbalance to be engaged with an external portable device,
wherein the first driving unit, the second driving unit, and the third driving unit further include a sensor unit therein so as to sense a movement of the first driving unit, the second driving unit, and the third driving unit in real time during photographing by the camera module.

10. The horizontal posture maintaining device of claim 9, wherein the control unit controls power supply for rotation to the first driving unit, the second driving unit, or the third driving unit in response a sensing signal transmitted from the sensor unit in order to control maintenance of horizontality of the camera.

* * * * *